United States Patent
Zhang

(10) Patent No.: US 10,033,563 B2
(45) Date of Patent: *Jul. 24, 2018

(54) EXTENDED GUARD INTERVAL FOR OUTDOOR WLAN

(71) Applicant: MARVELL WORLD TRADE LTD., St. Michael (BB)

(72) Inventor: Hongyuan Zhang, Fremont, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 15/075,823

(22) Filed: Mar. 21, 2016

(65) Prior Publication Data

US 2016/0204968 A1 Jul. 14, 2016

Related U.S. Application Data

(63) Continuation of application No. 14/483,106, filed on Sep. 10, 2014, now Pat. No. 9,294,323.

(Continued)

(51) Int. Cl.
*H04L 27/26* (2006.01)
*H04W 84/12* (2009.01)

(52) U.S. Cl.
CPC ...... *H04L 27/2602* (2013.01); *H04L 27/2607* (2013.01); *H04L 27/2626* (2013.01); *H04L 27/2605* (2013.01); *H04W 84/12* (2013.01)

(58) Field of Classification Search
CPC .................. H04L 27/00; H04L 84/00
See application file for complete search history.

(56) References Cited

U.S. PATENT DOCUMENTS 5,878,057 A 3/1999 Maa
6,167,515 A 12/2000 Lin
(Continued)

FOREIGN PATENT DOCUMENTS

CN 1271477 10/2000
CN 1571512 1/2005
(Continued)

OTHER PUBLICATIONS

Office Action in Japanese Patent Application No. 2016-540942, dated Feb. 14, 2017, with English translation (4 pages).

(Continued)

*Primary Examiner* — Andrew Lai
*Assistant Examiner* — Sumitra Ganguly

(57) ABSTRACT

A wireless network interface device selects a guard interval from a set of guard intervals including a first guard interval, a second guard interval, and a third guard interval, where in the first guard interval has a length that is 50% of a length of the second guard interval, and wherein the length of the second guard interval is 50% of a length of the third guard interval. The wireless network interface device generates a preamble of a data unit to include: a legacy signal field, a repetition of the legacy field, and a non-legacy field that includes a field that indicates the selected guard interval. The wireless network interface device generates a data portion of the data unit, including generating orthogonal frequency division multiplexing (OFDM) symbols of the data portion using the selected guard interval.

16 Claims, 15 Drawing Sheets

Related U.S. Application Data

(60) Provisional application No. 61/875,968, filed on Sep. 10, 2013, provisional application No. 61/911,232, filed on Dec. 3, 2013.

(56) References Cited

U.S. PATENT DOCUMENTS

| | | |
|---|---|---|
| 6,192,498 B1 | 2/2001 | Arato |
| 6,226,771 B1 | 5/2001 | Hilla et al. |
| 6,427,219 B1 | 7/2002 | Yang |
| 6,553,534 B2 | 4/2003 | Yonge, III et al. |
| 6,704,364 B1 | 3/2004 | Lim et al. |
| 6,856,590 B2 | 2/2005 | Okada et al. |
| 6,888,844 B2 | 5/2005 | Mallory et al. |
| 6,891,881 B2 | 5/2005 | Trachewsky et al. |
| 6,910,172 B2 | 6/2005 | Hara et al. |
| 6,934,902 B2 | 8/2005 | Hara et al. |
| 7,046,746 B1 | 5/2006 | Keaney et al. |
| 7,080,348 B2 | 7/2006 | Savage |
| 7,145,955 B1 | 12/2006 | Bohnke et al. |
| 7,203,885 B2 | 4/2007 | Gibart |
| 7,257,758 B1 | 8/2007 | Manula et al. |
| 7,336,667 B2 | 2/2008 | Allen, Jr. et al. |
| 7,388,853 B2 | 6/2008 | Ptasinski et al. |
| 7,406,106 B2 | 7/2008 | Mallory |
| 7,453,285 B2 | 11/2008 | Kiel et al. |
| 7,478,314 B1 | 1/2009 | Cheong et al. |
| 7,558,537 B2 | 7/2009 | Trachewsky et al. |
| 7,577,210 B2 | 8/2009 | Lee |
| 7,599,332 B2 | 10/2009 | Zelst et al. |
| 7,626,576 B2 | 12/2009 | Anandakumar et al. |
| 7,733,939 B2 | 6/2010 | Trachewsky |
| 7,742,390 B2 | 6/2010 | Mujtaba |
| 7,773,565 B2 | 8/2010 | Hansen et al. |
| 7,822,005 B2 | 10/2010 | Ptasinski et al. |
| 7,889,707 B2 | 2/2011 | Niu et al. |
| 7,904,519 B2 | 3/2011 | Czotscher et al. |
| 7,920,599 B1 | 4/2011 | Subramanian et al. |
| 7,961,593 B2 | 6/2011 | Porat et al. |
| 7,974,225 B2 | 7/2011 | Kasher |
| 7,987,405 B2 | 7/2011 | Turner et al. |
| 8,010,865 B2 | 8/2011 | Gu et al. |
| 8,046,663 B2 | 10/2011 | Yoon |
| 8,111,704 B2 | 2/2012 | Singhal et al. |
| 8,144,647 B2 | 3/2012 | Nabar et al. |
| 8,155,138 B2 | 4/2012 | van Nee |
| 8,179,897 B2 | 5/2012 | Allen, Jr. et al. |
| 8,201,065 B1 | 6/2012 | Cheong et al. |
| 8,218,554 B2 | 7/2012 | Allen, Jr. et al. |
| 8,223,072 B2 | 7/2012 | Ponnuswamy |
| 8,225,187 B1 | 7/2012 | Schultz et al. |
| 8,234,551 B2 | 7/2012 | Shen et al. |
| 8,245,108 B2 | 8/2012 | Yoon |
| 8,264,977 B2 | 9/2012 | Sanguineti et al. |
| 8,289,869 B2 | 10/2012 | Sawai |
| 8,310,981 B2 | 11/2012 | Damnjanovic et al. |
| 8,331,419 B2 | 12/2012 | Zhang et al. |
| 8,332,719 B2 | 12/2012 | You et al. |
| 8,339,978 B2 | 12/2012 | Sawai et al. |
| 8,369,301 B2 | 2/2013 | Cai |
| 8,397,126 B2 | 3/2013 | Xu et al. |
| 8,418,024 B2 | 4/2013 | You et al. |
| 8,462,863 B1 | 6/2013 | Zhang et al. |
| 8,494,089 B2 | 7/2013 | Aoki et al. |
| 8,498,362 B2 | 7/2013 | Zhang et al. |
| 8,509,051 B2 | 8/2013 | Ling et al. |
| 8,526,351 B2 | 9/2013 | Fischer et al. |
| 8,527,853 B2 | 9/2013 | Lakkis |
| 8,532,077 B2 | 9/2013 | Stacey et al. |
| 8,539,287 B2 | 9/2013 | Lee et al. |
| 8,542,589 B2 | 9/2013 | Surineni et al. |
| 8,543,884 B2 | 9/2013 | Mansour |
| 8,599,804 B2 | 12/2013 | Erceg et al. |
| 8,619,907 B2 | 12/2013 | Mujtaba et al. |
| 8,627,171 B2 | 1/2014 | Pi |
| 8,681,757 B2 | 3/2014 | Lee et al. |
| 8,718,021 B2 | 5/2014 | Yu et al. |
| 8,724,720 B2 | 5/2014 | Srinivasa et al. |
| 8,737,189 B2 | 5/2014 | Hansen et al. |
| 8,867,653 B2 | 10/2014 | Zhang et al. |
| 8,873,680 B2 | 10/2014 | Zhang |
| 8,885,740 B2 | 11/2014 | Zhang et al. |
| 8,948,283 B2 | 2/2015 | Zhang |
| 8,953,696 B2 | 2/2015 | Stoye |
| 8,982,889 B2 | 3/2015 | Zhang |
| 9,130,727 B2 * | 9/2015 | Zhang .................. H04L 1/0046 |
| 9,131,528 B2 | 9/2015 | Zhang et al. |
| 9,178,745 B2 | 11/2015 | Zhang et al. |
| 9,184,794 B1 | 11/2015 | Ibrahim et al. |
| 9,184,967 B1 | 11/2015 | Ibrahim et al. |
| 9,209,837 B1 | 12/2015 | Cheong et al. |
| 9,232,435 B2 | 1/2016 | Schliwa-Bertling et al. |
| 9,258,829 B1 | 2/2016 | Ibrahim et al. |
| 9,294,164 B2 | 3/2016 | Zhang et al. |
| 9,294,323 B2 * | 3/2016 | Zhang ................ H04L 27/2602 |
| 9,397,785 B1 | 7/2016 | Zhang et al. |
| 9,414,432 B2 | 8/2016 | Zhang |
| 9,667,460 B2 | 5/2017 | Zhang et al. |
| 9,712,358 B2 * | 7/2017 | Zhang ................ H04W 52/286 |
| 2003/0031151 A1 | 2/2003 | Sharma et al. |
| 2003/0056043 A1 | 3/2003 | Kostadinov |
| 2003/0142626 A1 | 7/2003 | Umayabashi et al. |
| 2004/0081131 A1 | 4/2004 | Walton et al. |
| 2005/0169261 A1 | 8/2005 | Williams et al. |
| 2006/0176966 A1 | 8/2006 | Stewart et al. |
| 2007/0002878 A1 | 1/2007 | Moorti et al. |
| 2007/0014375 A1 | 1/2007 | Nakao |
| 2007/0047666 A1 | 3/2007 | Trachewsky |
| 2007/0153760 A1 | 7/2007 | Shapira |
| 2007/0153830 A1 | 7/2007 | Xhafa et al. |
| 2007/0183523 A1 | 8/2007 | Koo et al. |
| 2008/0056393 A1 | 3/2008 | Niu et al. |
| 2008/0298435 A1 | 12/2008 | Lakkis |
| 2008/0299962 A1 | 12/2008 | Kasher |
| 2009/0034635 A1 | 2/2009 | Von Elbwart et al. |
| 2009/0103485 A1 | 4/2009 | Singh et al. |
| 2009/0196163 A1 | 8/2009 | Du |
| 2010/0046358 A1 | 2/2010 | van Nee |
| 2010/0046542 A1 | 2/2010 | van Zelst et al. |
| 2010/0046656 A1 | 2/2010 | van Nee et al. |
| 2010/0074277 A1 | 3/2010 | Nishibayashi et al. |
| 2010/0091675 A1 | 4/2010 | Sawai |
| 2010/0202301 A1 | 8/2010 | Wen et al. |
| 2010/0260159 A1 | 10/2010 | Zhang et al. |
| 2010/0309834 A1 | 12/2010 | Fischer et al. |
| 2010/0309848 A1 | 12/2010 | Erceg et al. |
| 2010/0310002 A1 | 12/2010 | Lauer et al. |
| 2011/0002219 A1 | 1/2011 | Kim et al. |
| 2011/0026639 A1 | 2/2011 | Rouquette-Leveil et al. |
| 2011/0092231 A1 | 4/2011 | Yoo et al. |
| 2011/0110348 A1 | 5/2011 | Lee et al. |
| 2011/0134899 A1 | 6/2011 | Jones, IV et al. |
| 2011/0142020 A1 | 6/2011 | Kang et al. |
| 2011/0149927 A1 | 6/2011 | Stacey et al. |
| 2011/0194655 A1 | 8/2011 | Sampath et al. |
| 2011/0222490 A1 | 9/2011 | Fischer et al. |
| 2011/0255620 A1 | 10/2011 | Jones, IV et al. |
| 2011/0271169 A1 | 11/2011 | Pi |
| 2011/0280182 A1 | 11/2011 | Kim et al. |
| 2011/0299382 A1 | 12/2011 | Van Nee et al. |
| 2011/0305296 A1 | 12/2011 | Van Nee |
| 2012/0039292 A1 | 2/2012 | Lee et al. |
| 2012/0039406 A1 | 2/2012 | Srinivasa et al. |
| 2012/0054587 A1 * | 3/2012 | Van Nee ............... H04L 1/0079 |
| | | 714/807 |
| 2012/0122495 A1 | 5/2012 | Weng et al. |
| 2012/0155447 A1 | 6/2012 | Vermani et al. |
| 2012/0170563 A1 | 7/2012 | Abraham et al. |
| 2012/0195391 A1 | 8/2012 | Zhang et al. |
| 2012/0201316 A1 | 8/2012 | Zhang et al. |
| 2012/0294268 A1 | 11/2012 | Lee et al. |
| 2012/0294294 A1 | 11/2012 | Zhang |
| 2012/0294392 A1 * | 11/2012 | Zhang ................ H04L 5/0023 |
| | | 375/340 |

(56) References Cited

U.S. PATENT DOCUMENTS

| | | |
|---|---|---|
| 2012/0300874 A1 | 11/2012 | Zhang |
| 2012/0327871 A1 | 12/2012 | Ghosh et al. |
| 2013/0039313 A1 | 2/2013 | Hansen et al. |
| 2013/0070869 A1 | 3/2013 | Motamed et al. |
| 2013/0121244 A1 | 5/2013 | Vermani et al. |
| 2013/0121348 A1 | 5/2013 | Zhang et al. |
| 2013/0122822 A1 | 5/2013 | Srinivasan et al. |
| 2013/0128807 A1 | 5/2013 | Vermani et al. |
| 2013/0202001 A1 | 8/2013 | Zhang |
| 2013/0216002 A1 | 8/2013 | Suh et al. |
| 2013/0259017 A1 | 10/2013 | Zhang et al. |
| 2013/0294317 A1 | 11/2013 | Malladi et al. |
| 2014/0029681 A1 | 1/2014 | Zhang et al. |
| 2014/0064194 A1 | 3/2014 | Schliwa-Bertling et al. |
| 2014/0112168 A1 | 4/2014 | Chen et al. |
| 2014/0185662 A1 | 7/2014 | Azizi et al. |
| 2014/0185695 A1 | 7/2014 | Kenney et al. |
| 2014/0211775 A1 | 7/2014 | Sampath et al. |
| 2014/0269770 A1 | 9/2014 | Kenney et al. |
| 2014/0307612 A1 | 10/2014 | Vermani et al. |
| 2014/0337690 A1 | 11/2014 | Zhang |
| 2014/0362935 A1* | 12/2014 | Porat .............. H04L 27/2602 375/260 |
| 2015/0009894 A1 | 1/2015 | Vermani et al. |
| 2015/0030101 A1 | 1/2015 | Zhang et al. |
| 2015/0071372 A1 | 3/2015 | Zhang |
| 2015/0117227 A1 | 4/2015 | Zhang et al. |
| 2015/0117433 A1* | 4/2015 | Zhang .............. H04L 69/22 370/338 |
| 2015/0207521 A1 | 7/2015 | Waters |
| 2015/0295676 A1 | 10/2015 | Kenney et al. |
| 2015/0381311 A1 | 12/2015 | Zhang et al. |
| 2015/0381394 A1* | 12/2015 | Zhang .............. H04L 1/0046 375/260 |
| 2016/0156750 A1* | 6/2016 | Zhang .............. H04L 69/22 370/338 |
| 2016/0204968 A1 | 7/2016 | Zhang |

FOREIGN PATENT DOCUMENTS

| | | |
|---|---|---|
| CN | 1989748 | 6/2007 |
| CN | 101282194 | 10/2008 |
| CN | 101321034 | 12/2008 |
| CN | 101562502 | 10/2009 |
| EP | 1968225 | 9/2008 |
| JP | 2005-304063 A | 10/2005 |
| JP | 2007-506359 A | 3/2007 |
| JP | 2013-543672 A | 12/2013 |
| JP | 2013-543677 A | 12/2013 |
| WO | WO-03005652 | 1/2003 |
| WO | WO-2006/025996 A2 | 3/2006 |
| WO | WO-2007/074777 | 7/2007 |
| WO | WO-2008/046163 | 4/2008 |
| WO | WO-2009/052420 A2 | 4/2009 |
| WO | WO-2009/059229 | 5/2009 |
| WO | WO-2009/084926 | 7/2009 |
| WO | WO-2009/114612 | 9/2009 |
| WO | WO-2010/120692 | 10/2010 |
| WO | WO-2011/087560 A2 | 7/2011 |
| WO | WO-2012/039640 | 3/2012 |
| WO | WO-2012/040396 | 3/2012 |
| WO | WO-2012/106635 | 8/2012 |
| WO | WO-2012/122119 | 9/2012 |
| WO | WO-2012/122119 A1 | 9/2012 |
| WO | WO-2013/152111 | 10/2013 |
| WO | WO-2014/183059 | 11/2014 |

OTHER PUBLICATIONS

International Preliminary Report on Patentability in International Application No. PCT/US2014/054991, dated Mar. 24, 2016 (10 pages).

IEEE Std 802.11™. 2012 (Revision of IEEE Std 802.11-2007) IEEE Standard for Information technology—Telecommunications and information exchange betweensystems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

IEEE Std 802.11ac/D6.0 "Draft Standard for Information Technology—Telecommunications and information exchange between systems—Local and metropolitan area networks—Specific requirements, Part 11: Wireless LAN Medium Access Control (MAC) andPhysical Layer (PHY) specifications: Amendment 4: Enhancements for Very High Throughput for Operation in Bands below 6 GHz," The Institute of Electrical and Electronics Engineers, Inc., pp. 1-446 (Jul. 2013).

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) andPhysical Layer (PHY) specifications: Amendment 4: TV White Spaces Operation," The Institute of Electrical and Electronics Engineers, Inc., pp. 1-123 (Nov. 2011).

Lee et al., "TGaf PHY proposal," The Institute of Electrical and Electronics Engineers, doc. No. IEEE 802.11-12/0809r5, pp. 1-43, Jul. 10, 2012.

de Vegt, "Potential Compromise for 802.11ah Use Case Document", Institute of Electrical and Electronics Engineers, doc. No. IEEE 802.11-11/0457r0, pp. 1-27 (Mar. 2011).

Park, "Proposed Specification Framework for TGah", The Institute of Electrical and Electronics Engineers, doc. No. IEEE 802.11-11/1137r6, pp. 1-13 (Mar. 2012).

Park, "Proposed Specification Framework for TGah D9.x", The Institute of Electrical and Electronics Engineers, doc. No. IEEE 802.11-yy/xxxxr0, pp. 1-30 (Jul. 2012).

Park, "Proposed Specification Framework for TGah", The Institute of Electrical and Electronics Engineers, doc. No. IEEE 802.11-11/1137r11, pp. 1-36 (Sep. 2012).

Park, "Specification Framework for TGah," The Institute of Electrical and Electronics Engineers, doc. No. IEEE 802.11-11/1137r13, pp. 1-58 (Jan. 14, 2013).

Shao, "Channel Selection for 802.11ah," doc.: IEEE 802.11-12/0816r0, pp. 1-11 (Jul. 2012).

Taghavi et al., "Introductory Submission for TGah", doc. No. IEEE 802.11-11/0062r0, Institute for Electrical and Electronics Engineers, pp. 1-5 (Jan. 14, 2011).

Vermani, et al. "Preamble Format for 1 MHz," The Institute of Electrical and Electronics Engineers, doc. No. IEEE 802.11-11/1482r2, pp. 1-30 (Nov. 2011).

Vermani, et al. "Spec Framework Text for PHY Numerology," The Institute of Electrical and Electronics Engineers, doc. No. IEEE 802.11-11/1311r0, pp. 1-5 (Sep. 2011).

Yu et al., "Coverage extension for IEEE802.11ah," The Institute of Electrical and Electronics Engineers, doc. No. IEEE 802.11-11/0035r1, pp. 1-10 (Jan. 2011).

Zhang et al., "11 ah Data Transmission Flow," The Institute of Electrical and Electronics Engineers, doc. No. IEEE 802.11-11/1484r1, pp. 1-15 (Nov. 2011).

Zhang et al., "1 MHz Waveform in Wider BW ", The Institute of Electrical and Electronics Engineers, doc. No. IEEE 802.11-12/0309r1, pp. 1-10 (Mar. 2012).

Zhang et al., "Beamforming Feedback for Single Stream," The Institute of Electrical and Electronics Engineers, doc. No. IEEE 802.11-12/1312r0, pp. 1/22 (Nov. 12, 2012).

International Search Report and Written Opinion in International Application No. PCT/US2014/054991, dated Jun. 5, 2015 (14 pages).

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) andPhysical Layer (PHY) specifications: Amendment 4: Enhancements for Very High Throughput for Operation in Bands below 6 GHz," The Institute of Electrical and Electronics Engineers, Inc., pp. 1-456 (Sep. 2013).

(56) References Cited

OTHER PUBLICATIONS

Chen, "Home Network Basis: Transmission Environments and Wired/Wireless Protocols," Prentice Hall, pp. 1-26 (Jul. 2003).
Hiertz, et al., "The IEEE 802.11 Universe," IEEE Communications Magazine, pp. 62-70, (Jan. 2010).
Mujtaba, S.A. "IEEE P802.11—Wireless LANs, TGn Sync Proposal Technical Specification," The Institute of Electrical and Electronics Engineers, Inc., doc.: IEEE 802.11-04/0889r6, pp. 1-131 (May 2005).
Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).
Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).
Stacey et al., "Specification Framework for TGac," document No. IEEE 802.11-09/0992r20, Institute for Electrical and Electronics Engineers, pp. 1-49, (Jan. 18, 2011).
van Nee et al. "The 802.11 n MIMO-OFDM Standard for Wireless LAN and Beyond," Wireless Personal Communications, vol. 37, pp. 445-453 (Jun. 2006).
Invitation to Pay Fees and Partial International Search Report for International Application No. PCT/US2014/054991, dated Mar. 17, 2015 (6 pages).
"IEEE P802.11n™/D3.00, Draft Standard for Information Technology-Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, Sep. 2007.
Cheong, et al., "Methods, Algorithms, Software, Circuits, Receivers and Systems for Decoding Convolutional Code," U.S. Appl. No. 13/871,520, filed Apr. 26, 2013.
Chun et al., "Legacy Support on HEW frame structure," doc: IEEE 11-13/1057r0, *The Institute of Electrical and Electronics Engineers, Inc.*, pp. 1-8 (Sep. 2013).
Francis, Michael, "Viterbi Decoder Block Decoding—Trellis Termination and Tail Biting," Xilinx XAPP551 v2.0, pp. 1-21 (Jul. 30, 2010).
Gunnam et al., "Multi-Rate Layered Decoder Architecture for Block LDPC Codes of the IEEE 802.11 n. Wireless Standard," IEEE International Symposium on Circuits and Systems, 2007 (ISCAS 2007), pp. 1645-1648 (2007).
Harada, "Project: IEEE P802.15 Working Group for Wireless Personal Area Network (WPANs)," IEEE 802.15-07-0693-003c (May 2007).
IEEE P802.15.4m/D3, May, 2013 IEEE Standard for Local metropolitan area networks—"Part 15.4: Low Rate Wireless Personal Area Networks (LR-WPANs)", Amendment 6: TV White Space Between 54 MHz and 862 MHz Physical Layer, Excerpt, 2 pages (May 2013).
IEEE Std 802.11ad™/D9.0 "Draft Standard for Information technology—Telecommunications and information Exchange Between Systems—Local and Metropolitan Area Networks—Specific Requirements" Part 11: Wireless LAN Medium Access Control (MAC) and Physical Layer (PHY) Specifications, Amendment 3: Enhancements for Very High Throughput in the 60 GHz Band *The Institute of Electrical and Electronics Engineers, Inc.*, (Jul. 2012).
IEEE Std P802.11 ad/D5.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 3: Enhancements for Very High Throughput in the 60 GHz Band," *The Institute of Electrical and Electronics Engineers, Inc.*, Sep. 2011.
Imashioya et al., "RTL Design of 1.2 Gbps MIMO WLAN System and Its Business Aspect," IEEE 9th Int'l Symposium on Communications and Information Technology (ISCIT 2009), *The Institute of Electrical and Electronics Engineers*, pp. 296-301 (2009).
Park, "Proposed Specification Framework for TGah", *The Institute of Electrical and Electronics Engineers*, doc. no. IEEE 802.11--yy/xxxxr05, (Jan. 2012).
Seok et al., "HEW PPDU Format for Supporting MIMO-OFDMA," IEEE 802.11-14/1210r0, 16 pages, (Sep. 14, 2014).
Shi et al., "Phase Tracking During VHT-LTF," Doc. No. IEEE 802.11-10/0771r0, *The Institute of Electrical and Electronics Engineers, Inc.*, pp. 1-19 (Jul. 2010).
Syafei et al., "A Design of Next Generation Gigabit MIMO Wireless LAN System ," IEEE 12th Int'l Conference on Advanced Communication Technology (ICACT 2010), *The Institute of Electrical and Electronics Engineers*, pp. 941-946 (2010).
Syafei et al., "A Gigabit MIMO WLAN System with International Standardization Strategy," IEEE Int'l Symposium on Intelligent Signal Processing and Communication Systems (ISPACS 2009), *The Institute of Electrical and Electronics Engineers*, pp. 228-231 (2009).
Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), *The Institute of Electrical and Electronics Engineers*, pp. 207-211 (2009).
van Zelst et al., "Pilot Sequence for VHT-Data," Doc. No. IEEE 802.11-10/0811r1, *The Institute of Electrical and Electronics Engineers, Inc.*, pp. 1-10 (Jul. 2010).
Zhang Zhao-Yang: "A Novel Afdm Transmission Scheme with Length-Adaptive Cyclic Prefix," Journal of Zhejiang University. Science, Zhejiant University Press, Hangzhou, Cn vol. 5, no. 11, 07 Jul. 2003, pp. 1336-1342.

\* cited by examiner

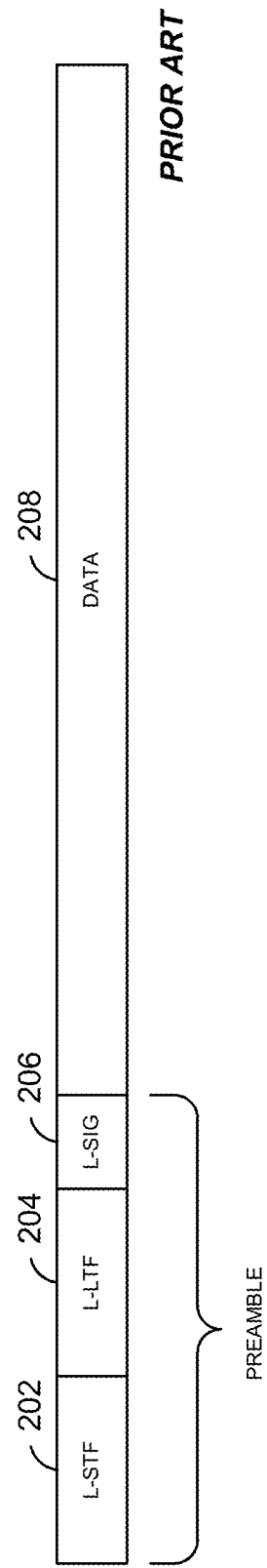
FIG. 2A  *PRIOR ART*
FIG. 2B  *PRIOR ART*

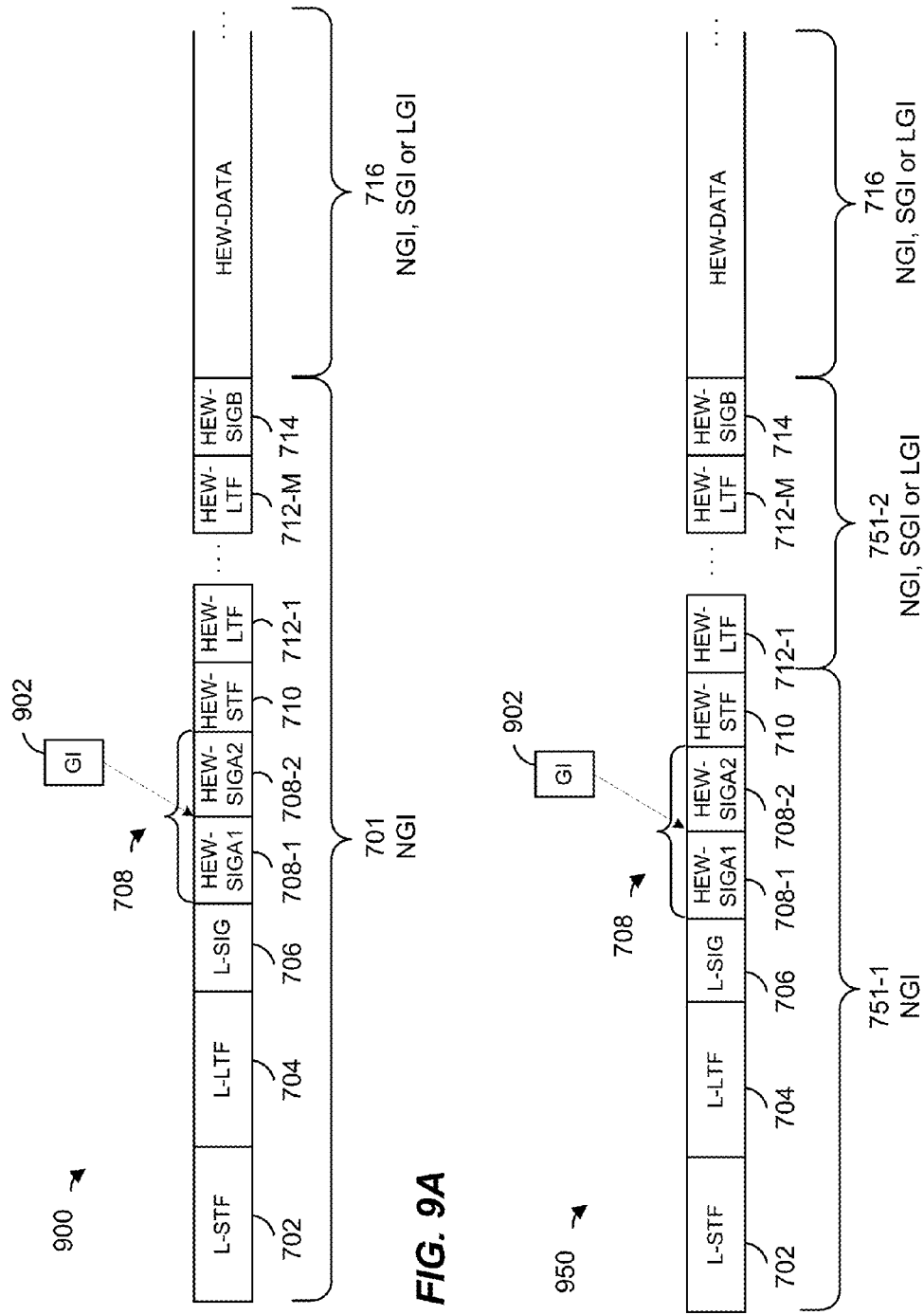

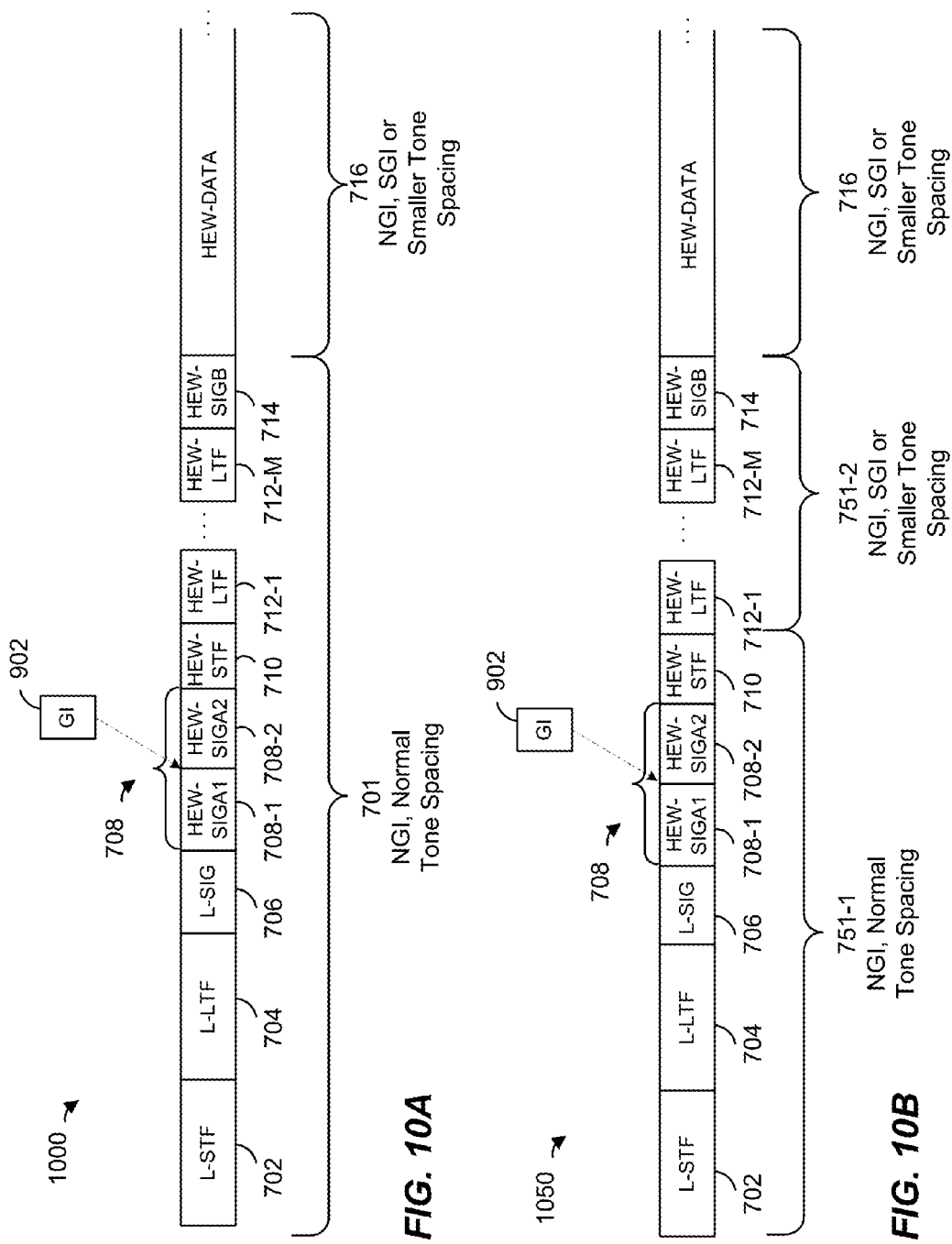

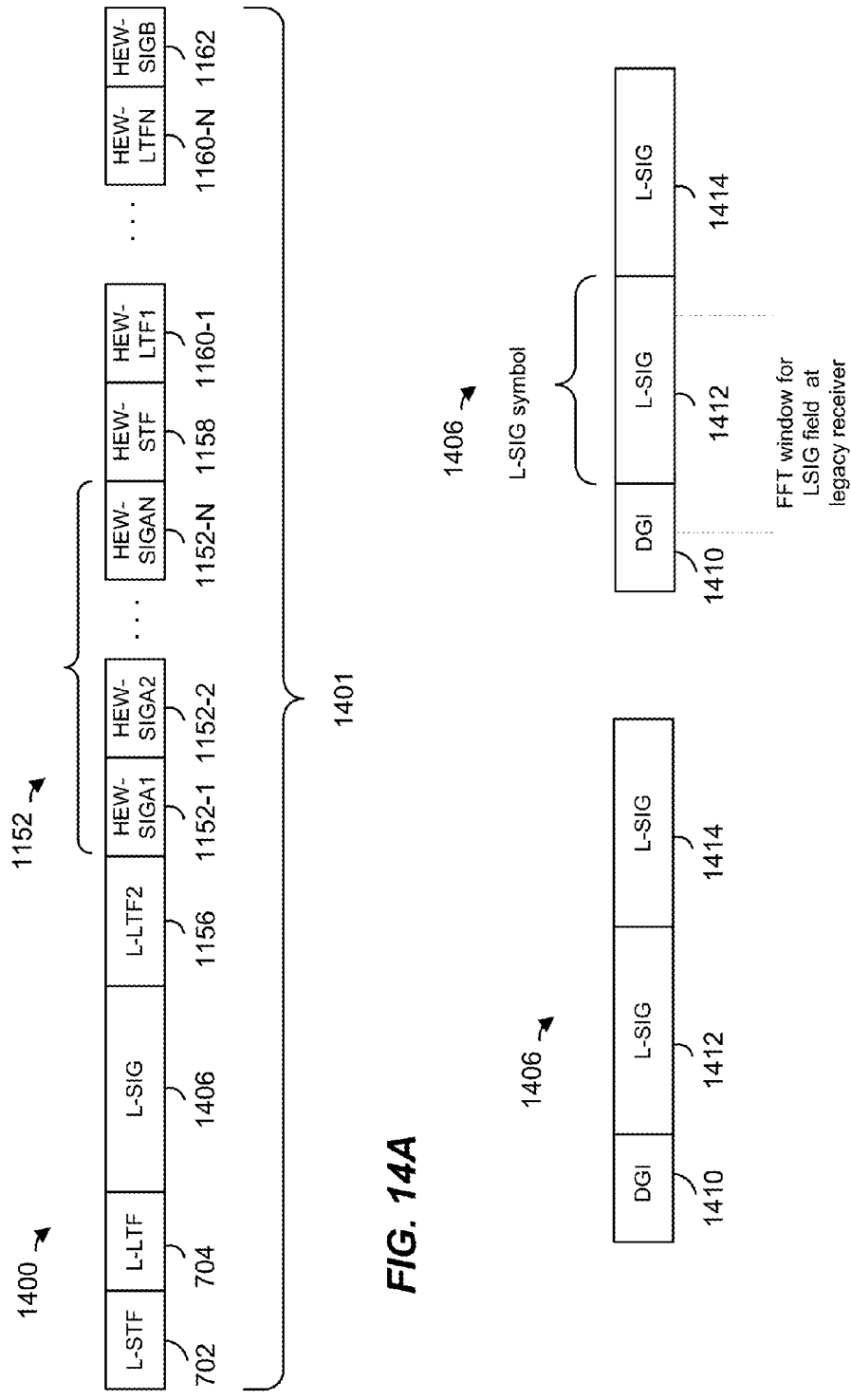

EXTENDED GUARD INTERVAL FOR OUTDOOR WLAN

CROSS-REFERENCES TO RELATED APPLICATIONS

This disclosure is a continuation of U.S. application Ser. No. 14/483,106, now U.S. Pat. No. 9,294,323, entitled "Extended Guard Interval for Outdoor WLAN," filed Sep. 10, 2014, which claims the benefit of U.S. Provisional Patent Application No. 61/875,968, entitled "Longer GI for Outdoor," filed on Sep. 10, 2013, and U.S. Provisional Patent Application No. 61/911,232, entitled "Longer GI for Outdoor," filed on Dec. 3, 2013, the disclosures of all of which are incorporated herein by reference in their entireties.

FIELD OF THE DISCLOSURE

The present disclosure relates generally to communication networks and, more particularly, to wireless local area networks that utilize orthogonal frequency division multiplexing (OFDM).

BACKGROUND

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method for generating a data unit for transmission via a wireless communication channel includes selecting, at a wireless network interface device, a guard interval from a set of guard intervals including a first guard interval, a second guard interval, and a third guard interval, where in the first guard interval has a length that is 50% of a length of the second guard interval, and wherein the length of the second guard interval is 50% of a length of the third guard interval. The method also includes generating, at the wireless network interface device, a preamble of a data unit to include: a legacy signal field, a repetition of the legacy field, and a non-legacy field that includes a field that indicates the selected guard interval. The method additionally includes generating, at the wireless network interface device, a data portion of the data unit, including generating orthogonal frequency division multiplexing (OFDM) symbols of the data portion using the selected guard interval.

In another embodiment, an apparatus comprises a wireless network interface device having one or more integrated circuits. The one or more integrated circuits are configured to select a guard interval from a set of guard intervals including a first guard interval, a second guard interval, and a third guard interval, where in the first guard interval has a length that is 50% of a length of the second guard interval, and wherein the length of the second guard interval is 50% of a length of the third guard interval. The one or more integrated circuits are also configured to generate a preamble of a data unit to include: a legacy signal field, a repetition of the legacy field, and a non-legacy field that includes a field that indicates the selected guard interval. The one or more integrated circuits are further configured to generate a data portion of the data unit, including generating orthogonal frequency division multiplexing (OFDM) symbols of the data portion using the selected guard interval.

In yet another embodiment, a tangible, non-transitory computer readable medium, or media, stores machine readable instructions that, when executed by one or more processors, cause the one or more processors to select a guard interval from a set of guard intervals including a first guard interval, a second guard interval, and a third guard interval, where in the first guard interval has a length that is 50% of a length of the second guard interval, and wherein the length of the second guard interval is 50% of a length of the third guard interval. The instructions also cause the one or more processors to cause a wireless network interface device to generate a preamble of a data unit to include: a legacy signal field, a repetition of the legacy field, and a non-legacy signal field that includes a field that indicates the selected guard interval. The instructions further cause the one or more processors to: cause the wireless network interface device to generate a data portion of the data unit, including generating orthogonal frequency division multiplexing (OFDM) symbols of the data portion using the selected guard interval; and cause the wireless network interface device to transmit the data unit via a wireless communication channel.

BRIEF DESCRIPTION OF THE DRAWINGS

FIGS. 2A and 2B are diagrams of a prior art data unit format;

FIG. 9A is a diagram illustrating an example data unit in which the normal guard interval is used for a preamble of the data unit, according to an embodiment.

FIG. 9B is a diagram illustrating an example data unit in which the normal guard interval is used for only a portion a preamble of the data unit, according to an embodiment.

FIG. 10A is a diagram illustrating an example data unit in which OFDM tone spacing is used to effectively increase guard interval duration, according to an embodiment.

FIG. 10B is a diagram illustrating an example data unit in which OFDM tone spacing is used to effectively increase guard interval duration, according to another embodiment.

FIG. 14A is a block diagram illustrating an extension guard interval mode data unit, according to an embodiment.

FIG. 14B is a diagram illustrating a legacy signal field of the extension guard interval data unit of FIG. 14A, according to one embodiment.

FIG. 14C is a diagram illustrating a Fast Fourier Transform (FFT) window for the legacy signal field of FIG. 14B at the legacy receiving device, according to an embodiment.

DETAILED DESCRIPTION

Figure 1:
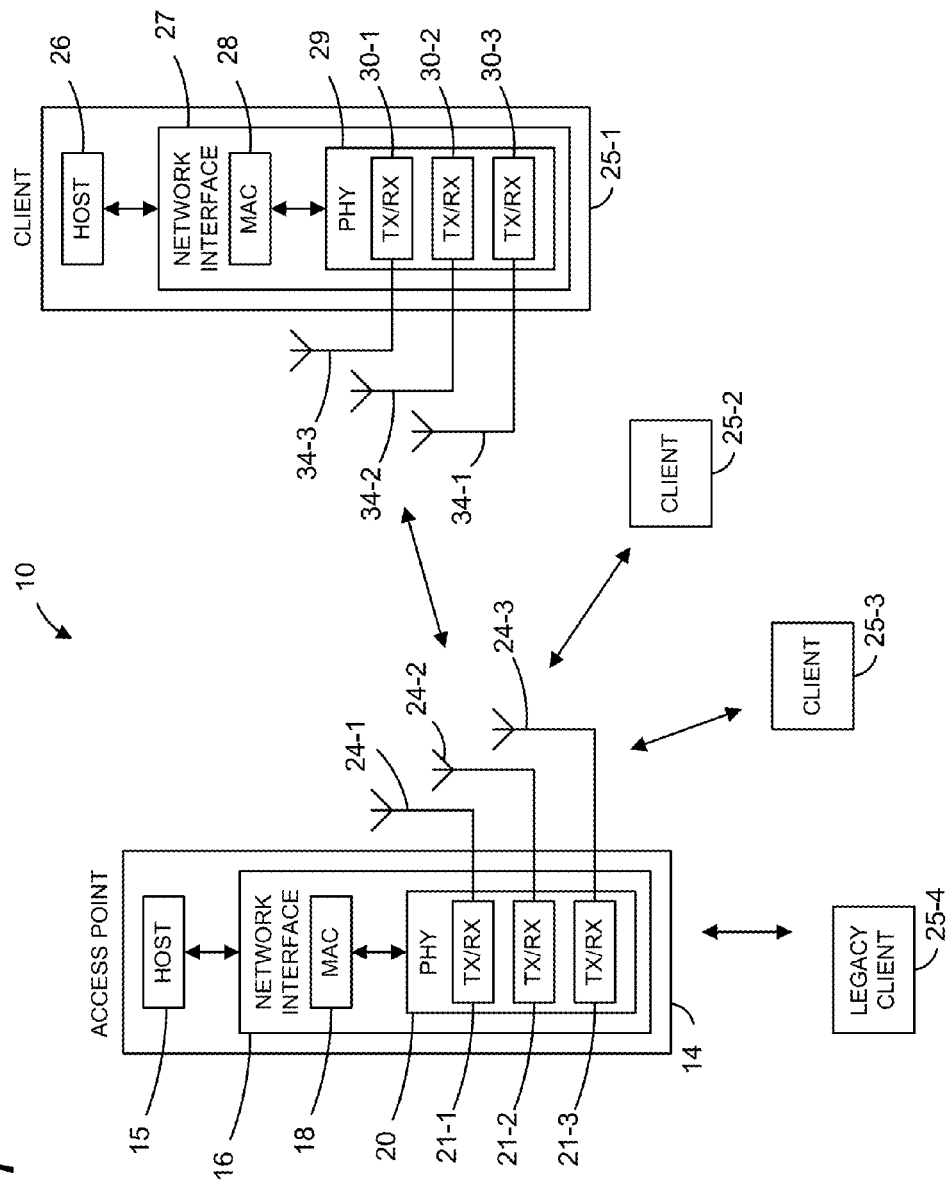
FIG. 1 is a block diagram of an example wireless local area network (WLAN) 10, according to an embodiment.

In embodiments described below, a wireless network device such as an access point (AP) of a wireless local area network (WLAN) transmits data streams to one or more client stations. The AP is configured to operate with client stations according to at least a first communication protocol. The first communication protocol is sometimes referred herein as "high efficiency WiFi" or "HEW" communication protocol. In some embodiments, different client stations in the vicinity of the AP are configured to operate according to one or more other communication protocols which define operation in the same frequency band as the HEW communication protocol but with generally lower data throughputs. The lower data throughput communication protocols (e.g., IEEE 802.11a, IEEE 802.11n, and/or IEEE 802.11ac) are collectively referred herein as "legacy" communication protocols. In at least some embodiments, the legacy communication protocols are generally deployed in indoor communication channels, and the HEW communication protocol is at least sometimes deployed for outdoor communications.

According to an embodiment, symbols transmitted by the AP include guard intervals to prevent or minimize intersymbol interference at the receiver caused by multipath propagation in the communication channel. The length of the guard interval needed to mitigate interference generally depends on the delay spread of the particular channel being utilized. For example, an outdoor communication channel is typically characterized by a greater channel delay spread compared to an indoor communication channel, in at least some embodiments and/or scenarios. In an embodiment, the HEW communication protocol defines a regular guard interval mode and an extension guard interval mode. The regular guard interval mode is generally used with communication channels characterized by shorter channel delay spreads (e.g., indoor communication channels), while the extension guard interval mode is generally used with communication channels characterized by relatively longer channel delay spreads (e.g., outdoor communication channels), in an embodiment. In an embodiment, a normal guard interval (NGI) or a short guard interval (SGI) is used in the regular guard interval mode, and a long guard interval (LGI) is used in the extension guard interval mode.

In an embodiment, a data unit transmitted by the AP includes a preamble and a data portion, wherein the preamble is used, at least in part, to signal, to a receiving device, various parameters used for transmission of the data portion. In various embodiments, the preamble of a data unit is used to signal, to a receiving device, the particular guard interval being utilized in at least the data portion of the data unit. In some embodiments, a same preamble format is used in the regular guard interval mode an in the extension guard interval mode. In one such embodiment, the preamble includes an indication set to indicate whether the NGI, the SGI or the LGI is used for at least the data portion of the data unit. In some embodiments, the indicated NGI, SGI or LGI is used for at least a portion of the preamble of the data unit, in addition to the data portion of the data unit. In an embodiment, the receiving device determines the particular guard interval being utilized based on the indication in the preamble of the data unit, and then decodes the appropriate remaining portion of the data unit (e.g., the data portion, or a portion of the preamble and the data portion) using the particular guard interval.

In another embodiment, a preamble used in the extension guard interval mode is formatted differently from a preamble used in the regular guard interval mode. For example, the preamble used in the extension guard interval mode is formatted such that the receiving device can automatically (e.g., prior to decoding) detect that the data unit corresponds to the extended guard interval mode. In an embodiment, when the receiving device detects that the data unit corresponds to the extended guard interval mode, the receiving device decodes the data portion of the data unit, and in at least some embodiments, at least a portion of the preamble as well as the data portion of the data unit, using the LGI. On the other hand, when the receiving device detects that the data unit does not correspond to the extended guard interval mode, the receiving device assumes that the data unit corresponds to the regular guard interval mode, in an embodiment. The receiving device then determines, for example based on an indication in the preamble, whether the NGI or the SGI is used in the data unit, and decodes at least the data portion of the data unit using the NGI or the SGI according to the determination, in an embodiment.

Additionally, in at least some embodiment, a preamble of a data unit in the regular guard interval mode and/or in the extension guard interval mode is formatted such that a client station that operates according to a legacy protocol, and not the HEW communication protocol, is able to determine certain information regarding the data unit, such as a duration of the data unit, and/or that the data unit does not conform to the legacy protocol. Additionally, a preamble of the data unit is formatted such that a client station that operates according to the HEW protocol is able to determine the data unit conforms to the HEW communication protocol, in an embodiment. Similarly, a client station configured to operate according to the HEW communication protocol also transmits data units such as described above, in an embodiment.

In at least some embodiments, data units formatted such as described above are useful, for example, with an AP that is configured to operate with client stations according to a plurality of different communication protocols and/or with WLANs in which a plurality of client stations operate according to a plurality of different communication protocols. Continuing with the example above, a communication device configured to operate according to both the HEW communication protocol and a legacy communication protocol is able to determine that the data unit is formatted according to the HEW communication protocol and not the legacy communication protocol. Similarly, a communication device configured to operate according to a legacy communication protocol but not the HEW communication protocol is able to determine that the data unit is not formatted according to the legacy communication protocol and/or determine a duration of the data unit.

FIG. 1 is a block diagram of an example wireless local area network (WLAN) 10, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In one embodiment, the MAC processing unit 18 and the PHY processing unit 20 are configured to operate according to a first communication protocol (e.g., HEW communication protocol). In another embodiment, the MAC processing unit 18 and the PHY processing unit 20 are also configured to operate according to a second communication protocol (e.g., IEEE 802.11ac Standard). In yet another embodiment, the MAC processing unit 18 and the PHY processing unit 20 are additionally configured to operate according to the second communication protocol, a third communication protocol and/or a fourth communication protocol (e.g., the IEEE 802.11a Standard and/or the IEEE 802.11n Standard).

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 is not configured to operate according to the first communication protocol but is configured to operate according to at least one of the second communication protocol, the third communication protocol and/or the fourth communication protocol (referred to herein as a "legacy client station").

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to the second communication protocol, the third communication protocol and/or the fourth communication protocol.

In an embodiment, one or both of the client stations 25-2 and 25-3, has a structure the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

In various embodiments, the PHY processing unit 20 of the AP 14 is configured to generate data units conforming to the first communication protocol and having formats described herein. The transceiver(s) 21 is/are configured to transmit the generated data units via the antenna(s) 24. Similarly, the transceiver(s) 24 is/are configured to receive the data units via the antenna(s) 24. The PHY processing unit 20 of the AP 14 is configured to process received data units conforming to the first communication protocol and having formats described hereinafter and to determine that such data units conform to the first communication protocol, according to various embodiments.

In various embodiments, the PHY processing unit 29 of the client device 25-1 is configured to generate data units conforming to the first communication protocol and having formats described herein. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is configured to process received data units conforming to the first communication protocol and having formats described hereinafter and to determine that such data units conform to the first communication protocol, according to various embodiments.

FIG. 2A is a diagram of a prior art OFDM data unit 200 that the AP 14 is configured to transmit to the client station 25-4 via orthogonal frequency division multiplexing (OFDM) modulation, according to an embodiment. In an embodiment, the client station 25-4 is also configured to transmit the data unit 200 to the AP 14. The data unit 200 conforms to the IEEE 802.11a Standard and occupies a 20 Megahertz (MHz) band. The data unit 200 includes a preamble having a legacy short training field (L-STF) 202, generally used for packet detection, initial synchronization, and automatic gain control, etc., and a legacy long training field (L-LTF) 204, generally used for channel estimation and fine synchronization. The data unit 200 also includes a legacy signal field (L-SIG) 206, used to carry certain physical layer (PHY) parameters of with the data unit 200, such as modulation type and coding rate used to transmit the data unit, for example. The data unit 200 also includes a data portion 208. FIG. 2B is a diagram of example data portion 208 (not low density parity check encoded), which includes a service field, a scrambled physical layer service data unit (PSDU), tail bits, and padding bits, if needed. The data unit 200 is designed for transmission over one spatial or space-time stream in a single input single output (SISO) channel configuration.

Figure 3:
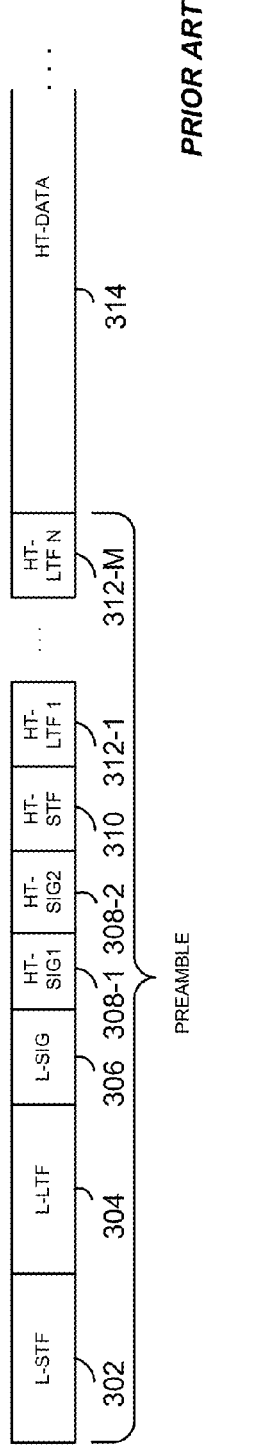
FIG. 3 is a diagram of another prior art data unit format.

FIG. 3 is a diagram of a prior art OFDM data unit 300 that the AP 14 is configured to transmit to the client station 25-4 via orthogonal frequency domain multiplexing (OFDM) modulation, according to an embodiment. In an embodiment, the client station 25-4 is also configured to transmit the data unit 300 to the AP 14. The data unit 300 conforms to the IEEE 802.11n Standard, occupies a 20 MHz band, and is designed for mixed mode situations, i.e., when the WLAN includes one or more client stations that conform to the IEEE 802.11a Standard but not the IEEE 802.11n Standard. The data unit 300 includes a preamble having an L-STF 302, an L-LTF 304, an L-SIG 306, a high throughput signal field (HT-SIG) 308, a high throughput short training field (HT-STF) 310, and M data high throughput long training fields (HT-LTFs) 312, where M is an integer generally determined by the number of spatial streams used to transmit the data unit 300 in a multiple input multiple output (MIMO) channel configuration. In particular, according to the IEEE 802.11n Standard, the data unit 300 includes two HT-LTFs 312 if the data unit 300 is transmitted using two spatial streams, and four HT-LTFs 312 is the data unit 300 is transmitted using three or four spatial streams. An indication of the particular number of spatial streams being utilized is included in the HT-SIG field 308. The data unit 300 also includes a data portion 314.

Figure 4:
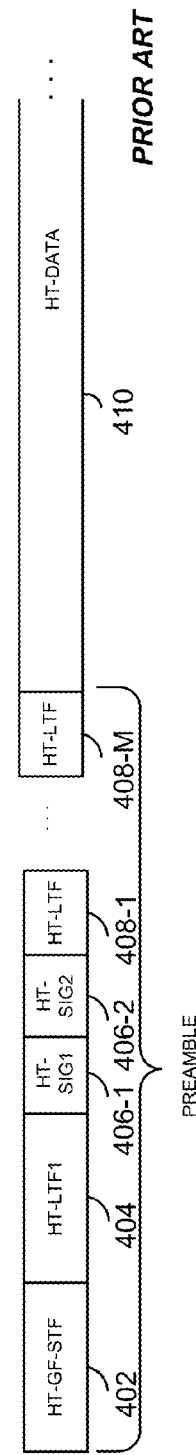
FIG. 4 is a diagram of another prior art data unit format.

FIG. 4 is a diagram of a prior art OFDM data unit 400 that the AP 14 is configured to transmit to the client station 25-4 via orthogonal frequency domain multiplexing (OFDM) modulation, according to an embodiment. In an embodiment, the client station 25-4 is also configured to transmit the data unit 400 to the AP 14. The data unit 400 conforms to the IEEE 802.11n Standard, occupies a 20 MHz band, and is designed for "Greenfield" situations, i.e., when the WLAN does not include any client stations that conform to the IEEE 802.11a Standard but not the IEEE 802.11n Standard. The data unit 400 includes a preamble having a high throughput Greenfield short training field (HT-GF-STF) 402, a first high throughput long training field (HT-LTF1) 404, a HT-SIG 406, and M data HT-LTFs 408, where M is an integer which generally corresponds to a number of spatial streams used to transmit the data unit 400 in a multiple input multiple output (MIMO) channel configuration. The data unit 400 also includes a data portion 410.

Figure 5:
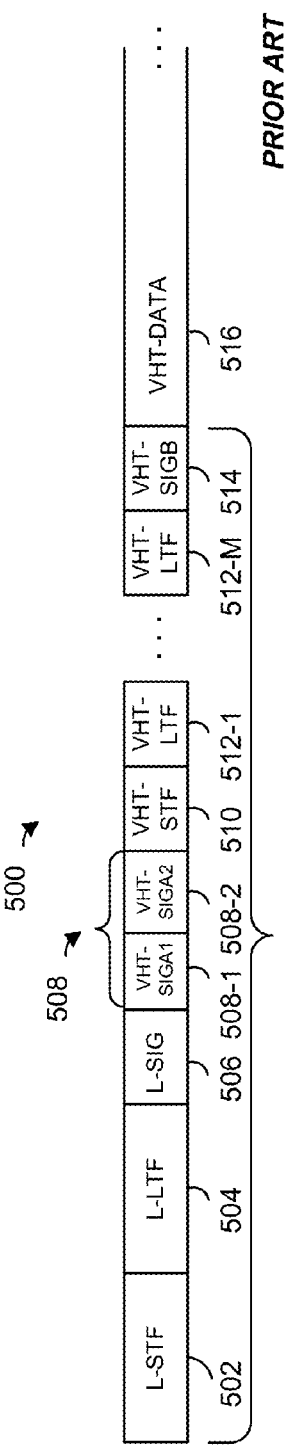
FIG. 5 is a diagram of another prior art data unit format.

FIG. 5 is a diagram of a prior art OFDM data unit 500 that the client station AP 14 is configured to transmit to the client station 25-4 via orthogonal frequency domain multiplexing (OFDM) modulation, according to an embodiment. In an embodiment, the client station 25-4 is also configured to transmit the data unit 500 to the AP 14. The data unit 500 conforms to the IEEE 802.11ac Standard and is designed for "Mixed field" situations. The data unit 500 occupies a 20 MHz bandwidth. In other embodiments or scenarios, a data unit similar to the data unit 500 occupies a different bandwidth, such as a 40 MHz, an 80 MHz, or a 160 MHz bandwidth. The data unit 500 includes a preamble having an L-STF 502, an L-LTF 504, an L-SIG 506, two first very high throughput signal fields (VHT-SIGAs) 508 including a first very high throughput signal field (VHT-SIGA1) 508-1 and a second very high throughput signal field (VHT-SIGA2) 508-2, a very high throughput short training field (VHT-STF) 510, M very high throughput long training fields (VHT-LTFs) 512, where M is an integer, and a second very high throughput signal field (VHT-SIG-B) 514. The data unit 500 also includes a data portion 516.

Figure 6A:
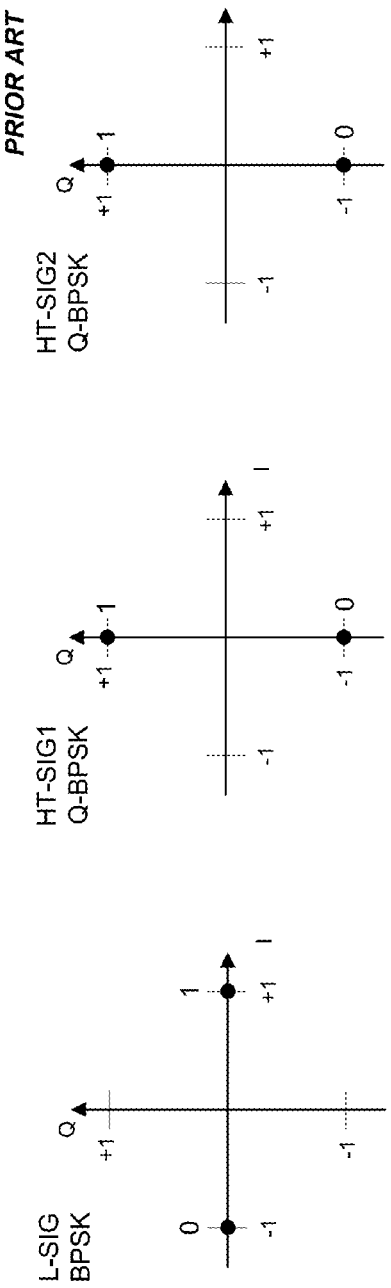
FIG. 6A are diagrams of modulation used to modulate symbols in a prior art data unit.

FIG. 6A is a set of diagrams illustrating modulation of the L-SIG, HT-SIG1, and HT-SIG2 fields of the data unit 300 of FIG. 3, as defined by the IEEE 802.11n Standard. The L-SIG field is modulated according to binary phase shift keying (BPSK), whereas the HT-SIG1 and HT-SIG2 fields are modulated according to BPSK, but on the quadrature axis (Q-BPSK). In other words, the modulation of the HT-SIG1 and HT-SIG2 fields is rotated by 90 degrees as compared to the modulation of the L-SIG field.

Figure 6B:
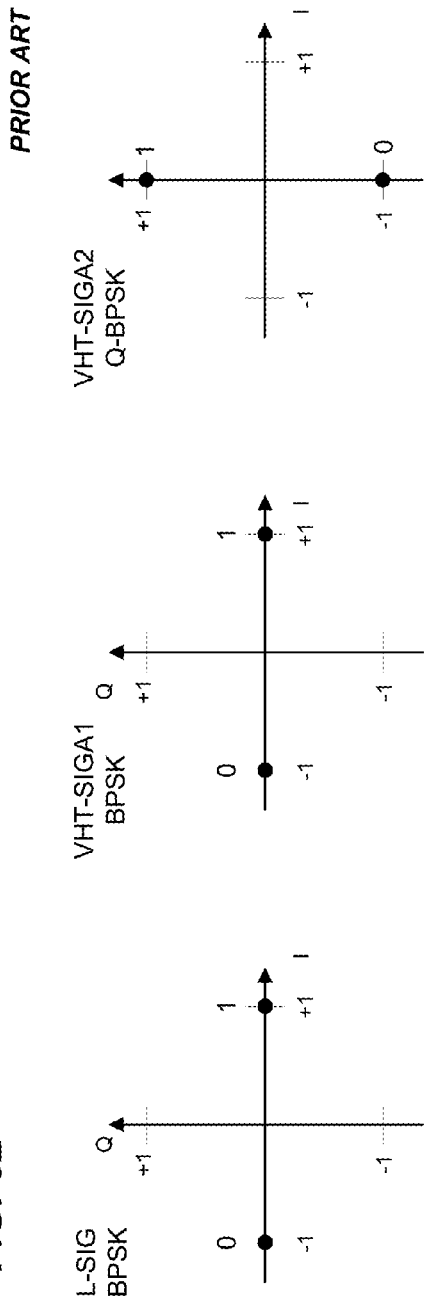
FIG. 6B are diagrams of modulation used to modulate symbols in an example data unit, according to an embodiment.

FIG. 6B is a set of diagrams illustrating modulation of the L-SIG, VHT-SIGA1, and VHT-SIGA2 fields of the data unit 500 of FIG. 5, as defined by the IEEE 802.11ac Standard. Unlike the HT-SIG1 field in FIG. 6A, the VHT-SIGA1 field is modulated according to BPSK, same as the modulation of the L-SIG field. On the other hand, the VHT-SIGA2 field is rotated by 90 degrees as compared to the modulation of the L-SIG field.

Figure 7A:
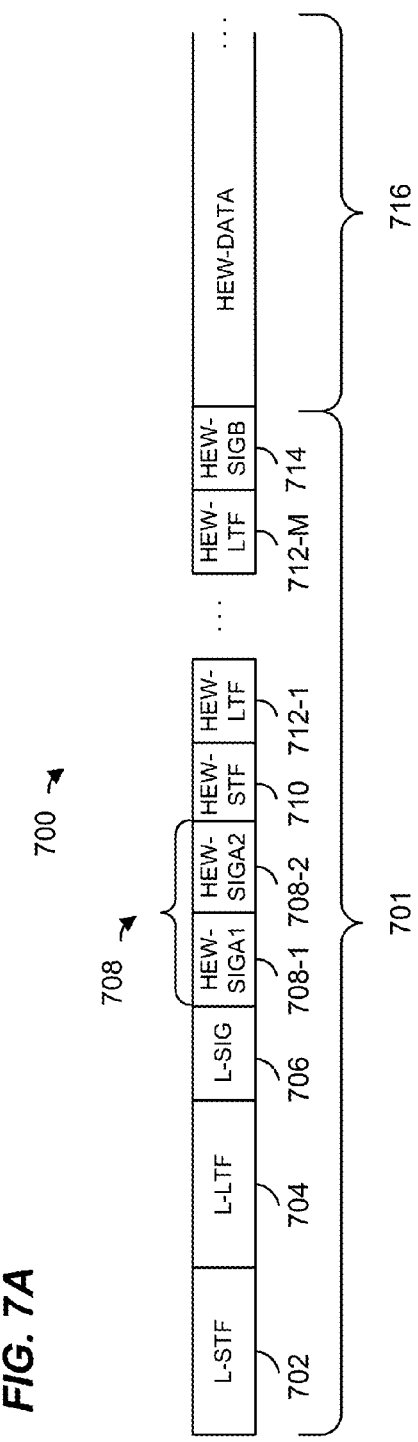
FIG. 7A is a diagram of an orthogonal frequency division multiplexing (OFDM) data unit, according to an embodiment.

FIG. 7A is a diagram of an OFDM data unit 700 that the client station AP 14 is configured to transmit to the client station 25-1 via orthogonal frequency domain multiplexing (OFDM) modulation, according to an embodiment. In an embodiment, the client station 25-1 is also configured to transmit the data unit 700 to the AP 14. The data unit 700 conforms to the first communication protocol and occupies a 20 MHz bandwidth. Data units similar to the data unit 700 occupy other suitable bandwidth such as 40 MHz, 80 MHz, 160 MHz, 320 MHz, 640 MHz, for example, or other suitable bandwidths, in other embodiments. The data unit 700 is suitable for "mixed mode" situations, i.e. when the WLAN 10 includes a client station (e.g., the legacy client station 24-4) that conforms to a legacy communication protocol, but not the first communication protocol. The data unit 700 is utilized in other situations as well, in some embodiments.

The data unit 700 includes a preamble 701 having an L-STF 702, an L-LTF 704, an L-SIG 706, two first HEW signal fields (HEW-SIGAs) 708 including a first HEW signal field (HEW-SIGA1) 708-1 and a second HEW signal field (HEW-SIGA2) 708-2, an HEW short training field (HEW-STF) 710, M HEW long training fields (HEW-LTFs) 712, where M is an integer, and a third HEW signal field (HEW-SIGB) 714. Each of the L-STF 702, the L-LTF 704, the L-SIG 706, the HEW-SIGAs 708, the HEW-STF 710, the M HEW-LTFs 712, and the HEW-SIGB 714 comprises an integer number of one or more OFDM symbols. For example, in an embodiment, the HEW-SIGAs 708 comprise two OFDM symbols, where the HEW-SIGA1 708-1 field comprises the first OFDM symbol and the HEW-SIGA2 comprises the second OFDM symbol. In at least some examples, the HEW-SIGAs 708 are collectively referred to as a single HEW signal field (HEW-SIGA) 708. In some embodiments, the data unit 700 also includes a data portion 716. In other embodiments, the data unit 700 omits the data portion 716.

In the embodiment of FIG. 7A, the data unit 700 includes one of each of the L-STF 702, the L-LTF 704, the L-SIG 706, the HEW-SIGA1 s 708. In other embodiments in which an OFDM data unit similar to the data unit 700 occupies a cumulative bandwidth other than 20 MHz, each of the L-STF 702, the L-LTF 704, the L-SIG 706, the HEW-SIGA1s 708 is repeated over a corresponding number of 20 MHz sub-bands of the whole bandwidth of the data unit, in an embodiment. For example, in an embodiment, the OFDM data unit occupies an 80 MHz bandwidth and, accordingly, includes four of each of the L-STF 702, the L-LTF 704, the L-SIG 706, the HEW-SIGA1s 708, in an embodiment. In some embodiments, the modulation of different 20 MHz sub-bands signals is rotated by different angles. For example, in one embodiment, a first subband is rotated 0-degrees, a second subband is rotated 90-degrees, a third sub-band is rotated 180-degrees, and a fourth sub-band is rotated 270-degrees. In other embodiments, different suitable rotations are utilized. The different phases of the 20 MHz sub-band signals result in reduced peak to average power ratio (PAPR) of OFDM symbols in the data unit 700, in at least some embodiments. In an embodiment, if the data unit that conforms to the first communication protocol is an OFDM data unit that occupies a cumulative bandwidth such as 20 MHz, 40 MHz, 80 MHz, 160 MHz, 320 MHz, 640 MHz, etc., the HEW-STF, the HEW-LTFs, the HEW-SIGB and the HEW data portion occupy the corresponding whole bandwidth of the data unit.

Figure 7B:
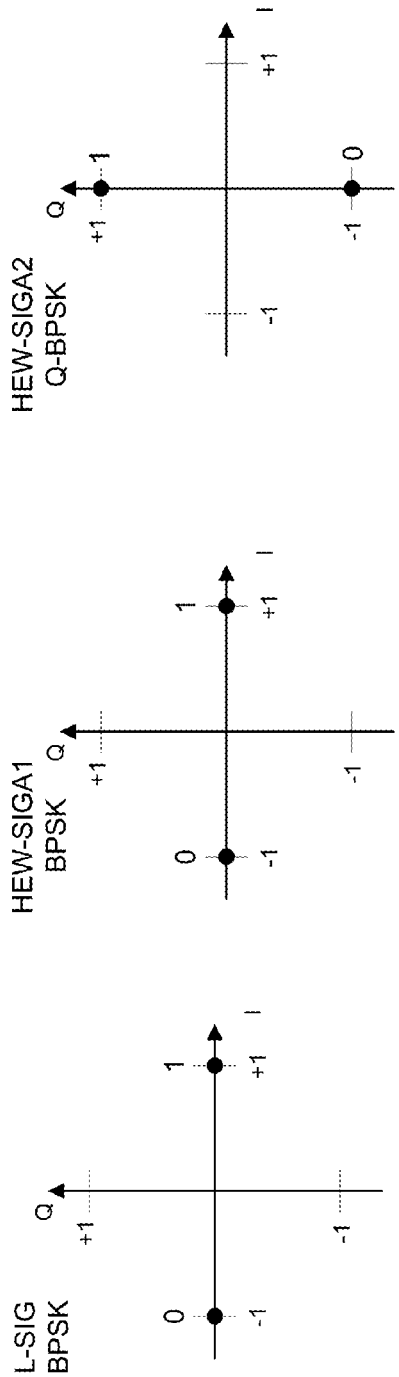
FIG. 7B are diagrams of modulation used to modulate symbols in the data unit depicted in FIG. 7A, according to an embodiment.

FIG. 7B is a set of diagrams illustrating modulation of the L-SIG 706, HEW-SIGA1 708-1, and HEW-SIGA2 708-2 of the data unit 700 of FIG. 7A, according to an embodiment. In this embodiment, the L-SIG 706, HEW-SIGA1 708-1, and HEW-SIGA2 708-2 fields have the same modulation as the modulation of the corresponding field as defined in the IEEE 802.11ac Standard and depicted in FIG. 6B. Accordingly, the HEW-SIGA1 field is modulated the same as the L-SIG field. On the other hand, the HEW-SIGA2 field is rotated by 90 degrees as compared to the modulation of the L-SIG field.

In an embodiment, because the modulations of the L-SIG 706, HEW-SIGA1 708-1, and HEW-SIGA2 708-2 fields of the data unit 700 correspond to the modulations of the corresponding fields in a data unit that conforms to the IEEE 802.11ac Standard (e.g., the data unit 500 of FIG. 5), legacy client stations configured to operate according to the IEEE 802.11a Standard and/or the IEEE 802.11n Standard will assume, in at least some circumstances, that the data unit 700 conforms to the IEEE 802.11ac Standard and will process the data unit 700 accordingly. For example, a client station the conforms to the IEEE 802.11a Standard will recognize the legacy IEEE 802.11a Standard portion of the preamble of the data unit 700 and will set the data unit duration according to a duration indicated in the L-SIG 706. For example, the legacy client station will calculate a duration based on a rate and a length (e.g., in number of bytes) indicated in the L-SIG field 706, according to an embodiment. In an embodiment, the rate and the length in the L-SIG field 706 are set such that a client station configured to operate according to a legacy communication protocol will calculate, based the rate and the length, a packet duration (T) that corresponds to, or at least approximates, the actual duration of the data unit 700. For example, the rate is set to indicate a lowest rate defined by the IEEE 802.11a Standard (i.e., 6 Mbps), and the length is set to a value computed such that packet duration computed using the lowest rate at least approximates the actual duration of the data unit 700, in one embodiment.

In an embodiment, a legacy client station that conforms to the IEEE 802.11a Standard, when receiving the data unit 700, will compute a packet duration for the data unit 700, e.g., using a rate and a length fields of L-SIG field 706, and will wait until the end of the computed packet duration before performing clear channel assessment (CCA), in an embodiment. Thus, in this embodiment, communication medium is protected against access by the legacy client station at least for the duration of the data unit 700. In an embodiment, the legacy client station will continue decoding the data unit 700, but will fail an error check (e.g., using a frame check sequence (FCS)) at the end of the data unit 700.

Similarly, a legacy client station configured to operate according to the IEEE 802.11n Standard, when receiving the data unit 700, will compute a packet duration (T) of the data unit 700 based on the rate and the length indicated in the L-SIG 706 of the data unit 700, in an embodiment. The legacy client station will detect the modulation of the first HEW signal field (HEW-SIGA1) 708-1 (BPSK) and will assume that the data unit 700 is a legacy data unit that conforms to the IEEE 802.11a Standard. In an embodiment, the legacy client station will continue decoding the data unit 700, but will fail an error check (e.g., using a frame check sequence (FCS)) at the end of the data unit. In any event, according to the IEEE 802.11n Standard, the legacy client station will wait until the end of a computed packet duration (T) before performing clear channel assessment (CCA), in an embodiment. Thus, communication medium will be protected from access by the legacy client station for the duration of the data unit 700, in an embedment.

A legacy client station configured to operate according to the IEEE 802.11ac Standard but not the first communication protocol, when receiving the data unit 700, will compute a packet duration (T) of the data unit 700 based on the rate and the length indicated in the L-SIG 706 of the data unit 700, in an embodiment. However, the legacy client station will not be able to detect, based on the modulation of the data unit 700, that the data unit 700 does not conform to the IEEE 802.11ac Standard, in an embodiment. In some embodiments, one or more HEW signal fields (e.g., the HEW-SIGA1 and/or the HEW-SIGA2) of the data unit 700 is/are formatted to intentionally cause the legacy client station to detect an error when decoding the data unit 700, and to therefore stop decoding (or "drop") the data unit 700. For example, HEW-SIGA 708 of the data unit 700 is formatted to intentionally cause an error when the SIGA field is decoded by a legacy device according to the IEEE 802.11ac Standard, in an embodiment. Further, according to the IEEE 802.11ac Standard, when an error is detected in decoding the VHT-SIGA field, the client station will drop the data unit 700 and will wait until the end of a computed packet duration (T), calculated, for example, based on a rate and a length indicated in the L-SIG 706 of the data unit 700, before performing clear channel assessment (CCA), in an embodiment. Thus, communication medium will be protected from access by the legacy client station for the duration of the data unit 700, in an embedment.

Figure 8:
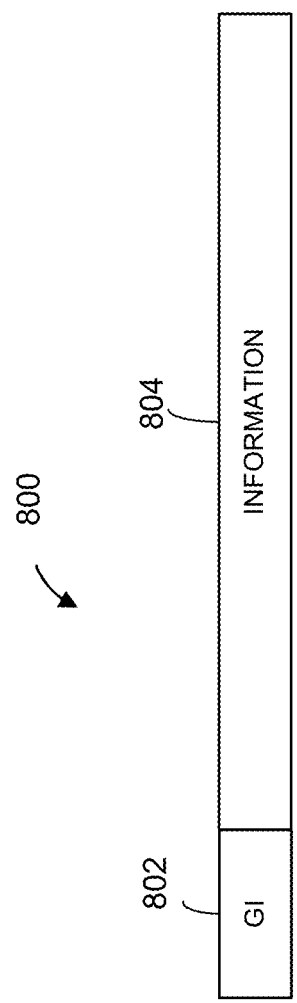
FIG. 8 is a block diagram of an OFDM symbol, according to an embodiment.

FIG. 8 is a diagram of an OFDM symbol 800, according to an embodiment. The data unit 700 of FIG. 7 includes OFDM symbols such as the OFDM symbols 800, in an embodiment. The OFDM symbol 800 includes a guard interval portion 802 and an information portion 804. In an embodiment, the guard interval comprises a cyclic prefix repeating an end portion of the OFDM symbol. In an embodiment, the guard interval portion 802 is used to ensure orthogonality of OFDM tones at a receiving device (e.g., the client station 25-1) and to minimize or eliminate inter-symbol interference due to multi-path propagation in the communication channel via which the OFDM symbol 800 is transmitted from a transmitting device (e.g., the AP 14) to the receiving device. In an embodiment, the length of the guard interval portion 802 is selected based on expected worst case channel delay spread in the communication channel between the transmitting device and the receiving device. For example, a longer guard interval is selected for outdoor communication channels typically characterized by longer channel delay spreads as compared to a shorter guard interval selected for indoor communication channels typically characterized by shorter channel delay spreads, in an embodiment.

According to an embodiment, the guard interval portion 802 corresponds to a short guard interval, a normal guard interval, or a long guard interval, depending on mode of transmission being utilized. In an embodiment, the short guard interval or the normal guard interval is used for indoor communication channels or communication channels with relatively short channel delay spreads, and the long guard interval is used for outdoor communication channels or communication channels with relatively long delay spreads. In an embodiment, the normal guard interval or the short guard interval is used for some or all OFDM symbols of an HEW data unit (e.g., the HEW data unit 700) when the HEW data unit is transmitted in regular guard interval mode, and the long guard interval is used for at least some OFDM symbols of the HEW data unit when the HEW data unit is transmitted in extension guard interval mode.

In an embodiment, the short guard interval (SGI) has a length of 0.4 µs, the normal guard interval is 0.8 µs and the long guard interval (LGI) has a length of 1.2 µs or 1.8 µs. In an embodiment, the information portion 804 has a length of 3.2 µs. In other embodiments, other suitable lengths for the SGI, the NGI, the LGI, and/or the information portion 804 are utilized. In some embodiments, the SGI has a length that is 50% of the length of the NGI, and the NGI has a length that is 50% of the length of the LGI. In other embodiments, the SGI has a length that is 75% or less of the length of the NGI, and the NGI has a length that is 75% or less of the length of the LGI. In other embodiments, the SGI has a length that is 50% or less of the length of the NGI, and the NGI has a length that is 50% or less of the LGI.

In some embodiments, the extension guard interval mode uses the normal guard interval duration of the regular guard interval mode, but uses a different OFDM modulation that effectively extends the guard interval duration in the extension guard interval mode. For example, in an embodiment, OFDM modulation with reduced tone spacing is used in the extension guard interval mode. For example, whereas the regular guard interval mode for a 20 MHz bandwidth OFDM data unit uses a 64-point discrete Fourier transform (DFT), resulting in 64 OFDM tones, the extension guard interval mode uses a 128-point DFT for a 20 MHz OFDM data unit, resulting in 128 OFDM tones in the same bandwidth. In this case, tone spacing in the extension guard interval mode OFDM symbols is reduced by a factor of two (½) compared to regular guard interval mode OFDM symbols. As another example, whereas the regular guard interval mode for a 20 MHz bandwidth OFDM data unit uses a 64-point discrete Fourier transform (DFT) resulting in 64 OFDM tones, the extension guard interval mode uses a 256-point DFT for a 20 MHz OFDM data unit resulting in 256 OFDM tones in the same bandwidth. In this case, tone spacing in the extension guard interval mode OFDM symbols is reduced by a factor of four (¼) compared to the regular guard interval mode OFDM symbols. In such embodiments, long GI duration of, for example, 1.6 µs is used. However, the duration of the information portion of the extension guard interval mode OFDM symbol is increased (e.g., from 3.2 µs to 6.4 µs), and the percentage of the GI portion duration to the total OFDM symbols duration remains the same, in an embodiment. Thus, in this case, loss of efficiency due to a longer GI symbol is avoided, in at least some embodiments. In various embodiments, the term "long guard interval" as used herein encompasses an increased duration of a guard interval as well as a decreased OFDM tone spacing that effectively increases duration of the guard interval.

FIG. 9A is a diagram illustrating an example data unit 900 in which the normal guard interval is used for a preamble of the data unit, according to an embodiment. The data unit 900 is generally the same as the data unit 700 of FIG. 7A and includes like-numbered elements with the data unit 700 of FIG. 7A. The HEW-SIGA field 708 (e.g., the HEW-SIGA1 708-1 or the HEW-SIGA2 708-2) of the data unit 900 includes a GI indication 902. According to an embodiment, the GI indication 902 is set to indicate one of (i) normal guard interval, (ii) short guard interval or (iii) long guard interval. In an embodiment, the guard interval (GI) indication 902 comprises two bits, wherein a first combination of values of the bits indicates the normal guard interval, a second combination of values of the bits indicates the short guard interval, and a third combination of values of the bits indicates the long guard. As illustrated in FIG. 9A, the normal guard interval is used for all OFDM symbols of the preamble of the data unit 700, and one of the normal guard interval, the short guard interval, and the long guard interval, as indicated by the GI indication 902, is used for OFDM symbols of the data portion 716, in the illustrated embodiment.

FIG. 9B is a diagram illustrating an example data unit 950 in which the normal guard interval is used for a portion of a preamble of the data unit, according to an embodiment. The data unit 950 is generally the same as the data unit 900 of FIG. 9A, except that in the data unit 750 includes a preamble 751 in which the guard interval indicated by the GI indication 902 is applied to OFDM symbols of a portion of the preamble 751 as well as to the OFDM symbols of the data portion 716. In particular, in the illustrated embodiment, the normal guard interval is used for a first portion 751-1 of the preamble 701, and one of the normal guard interval, the short guard interval, and the long guard interval, as indicated by the GI indication 902, is used for OFDM symbols of a second portion 751-2 of the preamble 751, in addition to OFDM symbols of the data portion 716. Accordingly, the guard interval indicated by the GI indication 902 skips the OFDM symbol that corresponds to the HEW-STF 710 and is applied beginning with the OFDM symbol that corresponds to the HEW-STF 712-1, in the illustrated embodiment. Skipping the HEW-STF 710 allows the device receiving the data unit 950 sufficient time to decode the GI indication 902 and to properly set up the receiver to begin decoding OFDM symbols using the guard interval indicated by the GI indication 902 prior to receiving such OFMD symbols, in at least some embodiments.

FIG. 10A is a diagram illustrating an example data unit 1000 in which OFDM tone spacing is used to effectively increase guard interval duration, according to an embodiment. The data unit 1000 is generally the same as the data unit 900 of FIG. 7A, except that in the data unit 1000, when the GI indication 902 indicates that the long GI is being utilized, the OFDM symbols of the data portion 716 are generated using OFDM modulation with smaller tone spacing compared to tone spacing used for normal guard interval OFDM symbols of the data unit 1000.

FIG. 10B is a diagram illustrating an example data unit 1050 in which OFDM tone spacing is used to effectively increase guard interval duration, according to another embodiment. The data unit 1050 is generally the same as the data unit 950 of FIG. 9B, except that in the data unit 1050, when the GI indication 902 indicates that the long GI is being utilized, the OFDM symbols of the second portion 751-2 and OFDM symbols of the data portion 716 are generated using OFDM modulation with smaller tone spacing compared to tone spacing used for normal guard interval OFDM symbols of the data unit 1050.

Figures 11A, 11B:
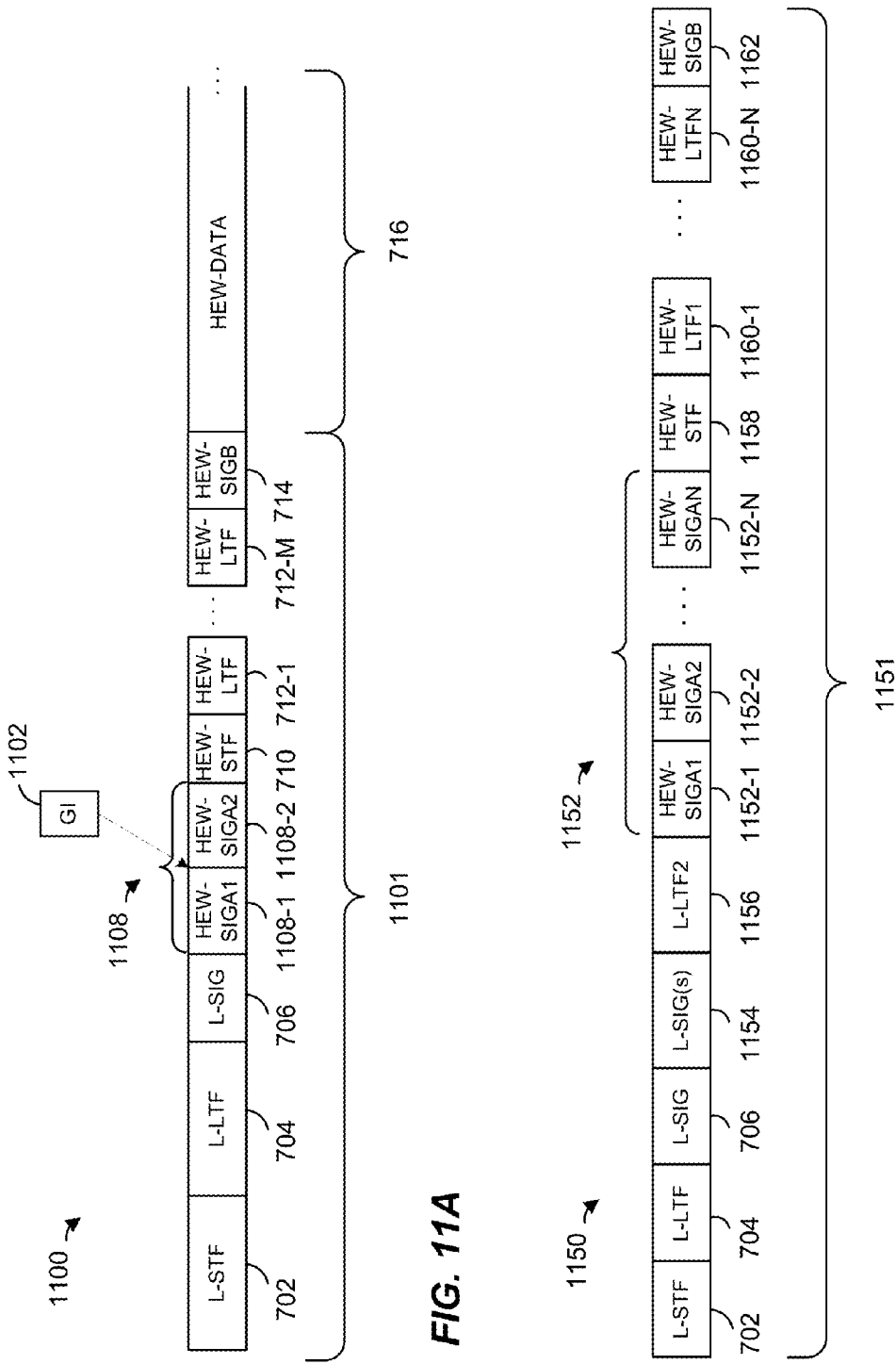
FIG. 11A is a diagram illustrating a regular guard interval mode data unit, according to an embodiment.
FIG. 11B is a diagram illustrating an extension guard interval mode data unit, according to an embodiment.

In some embodiments, a different preamble format is used for extension guard interval mode data units compared to the preamble used for regular guard interval mode data units. In such embodiments, a device receiving a data unit can automatically detect whether the data unit is a regular guard interval mode data unit or an extension guard interval mode data unit based on the format of the preamble of the data unit. FIG. 11A is a diagram illustrating a regular guard interval mode data unit 1100, according to an embodiment.

The regular guard interval mode data unit 1100 includes a regular guard interval mode preamble 1101. The regular guard interval mode preamble 1101 is generally the same as the preamble 701 of the data unit 700 of FIG. 7A. In an embodiment, the preamble 1101 includes a HEW-SIGA field 1108, which includes a first HEW-SIGA1 field 1108-1 and a second first HEW-SIGA2 field 1108-1. In an embodiment, the HEW-SIGA field 1108 (e.g., the HEW-SIGA1 1108-1 or the HEW-SIGA2 1108-2) of the preamble 1101 includes a GI indication 1102. The GI indication 1102 is set to indicate whether the normal guard interval or the short guard interval is used for OFDM symbols of the data portion 716 of the data unit 1100, in an embodiment. In an embodiment, the GI indication 1102 comprises one bit, wherein a first value of the bit indicates the normal guard interval and a second value of the bit indicates a short GI. As will be explained in more detail below, a device receiving the data unit 1100 is able to detect, based on the format of the preamble 1101, that the preamble 1101 is a regular guard interval mode preamble, and not an extension guard interval mode preamble, in an embodiment. Upon detecting that the preamble 1101 is the regular guard interval mode preamble, the receiving device determines, based on the GI indication 1101, whether the normal guard interval or the short guard interval is used for OFDM symbols of the data portion 716, and decodes the data portion 716 accordingly, in an embodiment.

FIG. 11B is a diagram illustrating an extension guard interval mode data unit 1150, according to an embodiment. The extension guard interval mode data unit 1150 includes an extension guard interval mode preamble 1151. The data unit 1150 is generally similar to the data unit 1100 of FIG. 11A, except that the preamble 1151 of the data unit 1150 is formatted differently from the preamble 1101 of the data unit 1100. In an embodiment, the preamble 1151 is formatted such that a receiving device that operates according to the HEW communication protocol is able to determine that the preamble 1151 is an extension guard interval mode preamble rather than a regular guard interval mode preamble. In an embodiment, the extension guard interval mode preamble 1151 includes an L-STF 702, an L-LTF 704, and an L-SIG 706, and one or more first HEW signal fields (HEW-SIGAs) 1152. In an embodiment, the preamble 1150 further includes one or more secondary L-SIG(s) 1154 that follow the L-SIG field 706. The secondary L-SIG(s) 1154 are followed by a second L-LTF field (L-LTF2) 1156, in some embodiments. In other embodiments, the preamble 1151 omits the L-SIG(s) 1154 and/or the L-LTF2 1156. In some embodiments, the preamble 1151 also includes an HEW-STF 1158, one or more HEW-LTF fields 1160, and a second HEW signal field (HEW-SIGB) 1162. In other embodiments, the preamble 1151 omits the HEW-STF 1156, the HEW-LTF(s) 1158 and/or the HEW-SIGB 1162. In an embodiment, the data unit 1150 also includes a data portion 716 (not shown in FIG. 11B).

In one embodiment in which the preamble 1151 includes one or more secondary L-LSIG(s) 1154, the content of each of the L-LSIG(s) 1154 is the same as the content of the L-LSIG 706 of the data unit 1150. In an embodiment, a receiving device receiving the data unit 1150 determines that the preamble 1151 corresponds to an extension guard interval mode preamble by detecting the repetition(s) of the L-SIG fields 706, 1154. Further, in an embodiment, both the rate subfield and the length subfield of the L-SIG 706, and, accordingly, the rate subfield(s) and the length subfield(s) of the secondary L-SIG(s) 1154 are set to fixed (e.g., predetermined) values. In this case, upon detecting the repetition(s) of the L-SIG fields 706, 1154, the receiving device uses the fixed values in the repeating L-SIG fields as additional training information to improve channel estimation, in an embodiment. In some embodiments, however, at least the length subfield of the L-SIG 706, and accordingly at least the length fields of the secondary L-SIG(s) 1154, is not set to a fixed value. For example, the length field is instead set to a value determined based on the actual length of the data unit 1150, in an embodiment. In one such embodiment, the receiving device first decodes the L-SIG 706, and then detects the repetition(s) of the L-SIG fields 706, 1154 using the value of the length subfield in L-SIG 706. In another embodiment, the receiving device first detects the repetition(s) of the L-SIG fields 706, 1154, and then combines the detected multiple L-SIG fields 706, 1154 to improve decoding reliability of the L-SIG fields 706, 1154 and/or uses the redundant information in the multiple L-SIG fields 706, 1154 to improve channel estimation.

In an embodiment in which the preamble 1151 includes L-LTF 1156, the OFDM symbol(s) of the L-LTF 1156 are generated using the long guard interval (e.g., increased duration guard interval or decreased OFDM tone spacing guard interval). In another embodiment in which the preamble 1151 includes L-LTF 11156, the OFDM symbol(s) of the L-LTF2 1506 are generated using the normal guard interval. For example, if a double guard interval (DGI) used in the L-LTF 704 is sufficiently long for the communication channel in which the data unit 1150 travels from the transmitting device to the receiving device, then OFDM symbols of the L-LTF2 1506 are generated using the normal guard interval or, alternatively, the preamble 1151 omits the L-LTF 1556, in an embodiment.

Figure 12A:
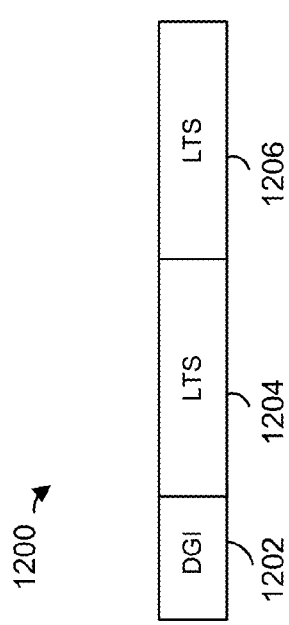
FIGS. 12A-12B are diagrams illustrating two possible formats of a long training field, according to two example embodiments.
Figure 12B:
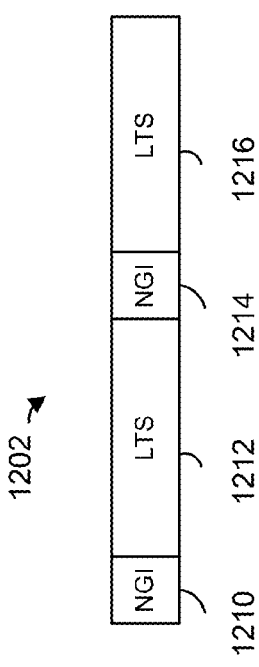

In another embodiment, the preamble 1151 omits the secondary L-SIG(s) 1154, but includes the L-LTF2 1156. In this embodiment, a receiving device detects that the preamble 1151 is the extension range preamble by detecting the presence of the L-LTF2 1156. FIGS. 12A-12B are diagrams illustrating two possible formats of LTFs suitable for use as the L-LTF2 1156 according to two example embodiments. Turning first to FIG. 12A, in a first example embodiment, an L-LTF2 1200 is formatted in the same manner as the L-LTF 704, i.e., as defined by a legacy communication protocol (e.g., the IEEE 802.11a/n/ac Standards). In particular, in the illustrated embodiment, the L-LTF2 1200 includes a double guard interval (DGI) 1202 followed by two repetitions of a long training sequence 1204, 1206. Turning now to FIG. 12B, in another example embodiment, an L-LTF2 1208 is formatted differently from the L-LTF 704. In particular, in the illustrated embodiment, the L-LTF2 1208 includes a first normal guard interval 1210, a first repetition of a long training sequence 1212, a second normal guard interval 1214, and a second repetition of the long training sequence 1216.

Referring back to FIG. 11B, in an embodiment, the HEW-SIGA(s) 1152 are generated using the long guard interval (e.g., increased duration guard interval or decreased OFDM tone spacing guard interval). In an embodiment, the number of the HEW-SIGAs 1152 is the same as the number of the HEW-SGA(s) 1108 of the regular guard interval mode preamble 1101. Similarly, in an embodiment, the content of the HEW-SIGAs 1152 is the same as the content of the HEW-SGA(s) 1108 of the regular guard interval mode preamble 1101. In other embodiments, the number and/or the content of the HEW-SIGAs 1152 is different from the number and/or content of the HEW-SGA(s) 1108 of the regular guard interval mode preamble 1101. A device receiving the data unit 1150 decodes the HEW-SIGA(s) 1152 using the long guard interval based on detecting that the preamble 1151 corresponds to the extension guard interval mode preamble and interprets the HEW-SIGA(s) 1152 appropriately as defined for the extension guard interval mode, in an embodiment.

Figure 13A:
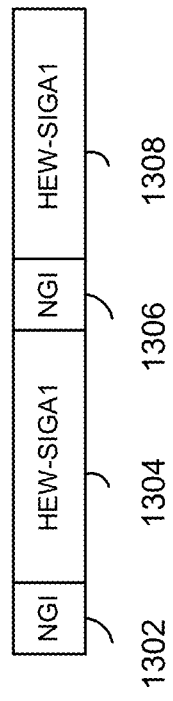
FIG. 13A is a diagram illustrating a non-legacy signal field of the regular guard interval mode data unit of FIG. 11A, according to an embodiment.
Figure 13B:
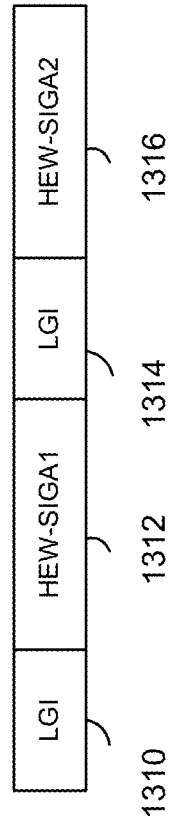
FIG. 13B is a diagram illustrating a non-legacy signal field of the extension guard interval mode data unit of FIG. 11B, according to an embodiment.

In an embodiment in which the preamble 1151 omits the L-SIG(s) 1154 and/or L-LTF2 1156, a receiving device determines whether a preamble corresponds to the extension guard interval mode preamble 1151 or the to the normal guard interval preamble 1101 by detecting whether the HEW-SIGA field in the preamble is generated using the long guard interval or the normal guard interval based on auto-correlation of the HEW-SIGA field using the long guard interval and the normal guard interval. FIGS. 13A-13B are diagrams of the HEW-SIGA 1108 of the regular guard interval mode preamble 1101 and the HEW-SIGA 1152 of the extension guard interval mode preamble 1151, respectively, according to an embodiment. In the illustrated embodiment, the HEW-SIGA 1108 of the regular guard interval mode preamble 1101 includes a first NGI 1302, a first HEW-SIGA field 1304, a second NGI 1306, and a second HEW-SIGA field 1308. In the other hand, the HEW-SIGA 1152 of the extension guard interval mode preamble 1151 includes a first LGI 1310, a first HEW-SIGA field 1312, a second LGI 1314, and a second HEW-SIGA field 1312. In an embodiment, a receiving device performs a first auto-correlation of the HEW-SIGA field using a normal guard interval structure, such as the structure illustrated in FIG. 13A, performs a second auto-correlation using a long guard interval structure, such as the structure illustrated in FIG. 13B, and performs a comparison of the auto-correlation results, in an embodiment. If auto-correlation of the HEW-SIGA field using the long guard interval produces a greater result compared to the result of the auto-correlation of the HEW-SIGA field using the normal guard interval, then the receiving device determines that the preamble corresponds to the extension guard interval mode preamble 1151, in an embodiment. On the other hand, if auto-correlation of the HEW-SIGA field using the normal guard interval produces a greater result compared to the result of auto-correlation of the HEW-SIGA field with the long guard interval, then the receiving device determines that the preamble corresponds to the regular guard interval mode preamble 1101, in an embodiment.

Referring again to FIG. 11B, in an embodiment, the preamble 1151 is formatted such that a legacy client station can determine a duration of the data unit 1150 and/or that the data unit does not conform to a legacy communication protocol. Additionally, the preamble 1151 is formatted such that a client station that operates according to the HEW protocol is able to determine that the data unit conforms to the HEW communication protocol, in an embodiment. For example, at least two OFDM symbols immediately following the L-SIG 706 of the preamble 1151, such as the L-LSIG(s) 1154 and/or the L-LTF2 1156 and/or the HEW-SIGA(s) 1152, are modulated using BPSK modulation. In this case, a legacy client station will treat the data unit 1150 as a legacy data unit, will determine a duration of the data unit based on the L-SIG 706, and will refrain from accessing the medium for the determined duration, in an embodiment. Further, one or more other OFDM symbols of the preamble 1151, such as one or more of the HEW-SIG(s) 1152 are modulated using Q-BPSK modulation, allowing a client station operating according to the HEW communication protocol to detect that the data unit 1150 conforms to the HEW communication protocol, in an embodiment.

In some embodiments, the HEW communication protocol allows beamforming and/or multi user MIMO (MU-MIMO) transmission in the extension guard interval mode. In other embodiments, the HEW communication protocol allows only single stream and/or only single user transmission in the extension guard interval mode. With continued reference to FIG. 11B, in an embodiment in which the preamble 1151 includes the HEW-STF 1158 and the HEW-LTF(s) 1160, the AP 14 applies beamforming and/or multi-user transmission beginning with the HEW-STF 1158. In other words, the fields of the preamble 1151 precede the HEW-STF 1158 are omni-directional and, in multi-user mode, are intended to be received by all intended recipients of the data unit 1150, while the HEW-STF field 1158, as well as the preamble fields that follow the HEW-STF field 1158 and the data portion that follows the preamble 1151, are beam-formed and/or include different portions intended to be received by different intended recipients of the data unit 1150, in an embodiment. In an embodiment, the HEW-SIGB field 162 includes user-specific information for the intended recipients of the data unit 1150 in MU-MIMO mode. The HEW-SIGB field 1162 is generated using the NGI or the LGI, depending on an embodiment. Similarly, the HEW-STF 1158 is generated using the NGI or the LGI, depending on an embodiment. In an embodiment, the training sequence used on the HEW-STF 1158 is the sequence defined in a legacy communication protocol, such as in the IEEE 802.11ac protocol.

On the other hand, in an embodiment in which the preamble 1151 omits the HEW-STF 1158 and the HEW-LTF(s) 1160, beamforming and MUMIMO are not allowed in the extension guard interval mode. In this embodiment, only single user single stream transmission is allowed in the extension guard interval mode. In an embodiment, a receiving device obtains a single stream channel estimate based on the L-LTF field 704, and demodulates the data portion of the data unit 1150 based on the channel estimate obtained based on the L-LTF field 704.

FIG. 14A is a block diagram illustrating an extension guard interval mode data unit 1400, according to an embodiment. The data unit 1400 includes an extension guard interval mode preamble 1401. The extension guard interval 1401 is generally similar to the extension guard interval mode 1151 of FIG. 11B, except that the L-SIG 706 and the secondary L-SIG 1154 of the preamble 1151 are combined into a single L-SIG field 1406 in the preamble 1401. FIG. 14B is a diagram illustrating the L-SIG field 1406 according to one embodiment. In the embodiment of FIG. 14B, the L-SIG field 1406 includes a double guard interval 1410, an first L-SIG field 1412, which includes contents of L-SIG field 706 of the preamble 1151, and a second L-SIG field 1414, which includes contents of the secondary L-SIG2 field 1154 of the preamble 1151. In various embodiments, L-SIG field 1406 includes a length subfield set to a fixed value or set to a variable value, as disused above with respect to the L-SIG fields 706, 1154 of FIG. 11B. In various embodiments, redundant (repeated) bits in L-SIG field 1406 are used for improved channel estimation as discussed above with respect to L-SIG fields 706, 1154 of FIG. 11B.

In an embodiment, a legacy client station receiving the data unit 1400 assumes that the L-SIG field 1406 includes a normal guard interval. As illustrated in FIG. 14C, the FFT window for L-SIG information bits assumed at the legacy client station is shifted compared to the actual L-SIG field 1412, in this embodiment. In an embodiment, to ensure that constellation points within the FFT window correspond to BPSK modulation, as expected by the legacy client station, and to this allow the legacy client station to properly decode the L-SIG field 1412, modulation of the L-SIG field 1412 is phase-shifted relative to regular BPSK modulation. For example, in a 20 MHz OFDM symbol, if the normal guard interval is 0.8 μs, and the double guard interval is 1.6 μs, then modulation of an OFDM tone k of the L-SIG field 1412 is shifted with respect to the corresponding OFDM tone k of the original L-SIG as can be seen from:

$$S_{LSIG}^{(k)} = S_{SLSIG\text{-}LSIG\,(-j)}^{(k)} e^{-j\cdot 2\pi\cdot 0.8\cdot 20/64} = S_{SLSIG\text{-}LSIG}^{(k)}.$$

Equation 1

Accordingly, in an embodiment, L-SIG field 1412 is modulated using reverse Q-BPSK rather than regular BPSK. Thus, for example, a bit of value 1 is modulated onto −j, and a bit of value 0 is modulated onto j, resulting in {j, −j} modulation rather than the regular {1, −1} BPSK modulation, in an embodiment. In an embodiment, due to the reverse Q-BPSK modulation of the L-SIG field 1412, a legacy client station can properly decode the L-SIG field 1412 an determine the duration of the data unit 1400 based on the L-SIG 1412 field, in an embodiment. A client station that operates according to the HEW protocol, on the other hand, can auto-detect that the preamble 1401 is an extension guard interval mode preamble by detecting the repetition of the L-SIG field 1412 or by detecting the reverse Q-BPSK modulation of the L-SIG field within the FFT window of the legacy client station, in an embodiment. Alternatively, in other embodiments, a client station that operates according to the HEW protocol detects that the preamble 1401 is an extension guard interval mode preamble using other detection methods discussed above, such as based on modulation or format of the HEW-SIGA field(s) 1152.

Referring FIGS. 11A-11B and 14A, long guard interval is used for initial OFDM symbols of both a regular guard interval mode preamble (e.g., the preamble 1101) and a long guard interval preamble (e.g., the preamble 1151 or the preamble 1401), in some embodiments. For example, referring to FIGS. 11A-11B, the L-STF field 702, the L-LTF field 704 and the L-SIG field 706, 1154, and HEW-SIGA field 1152 is each generated using the long guard interval, in an embodiment. Similarly, referring to FIG. 14A, the L-STF field 702, the L-LTF field 704, the L-SIG field 1406, and the HEW-SIGA(s) 1152 are generated using the long guard interval, in an embodiment. In an embodiment, a receiving device can determine whether a preamble corresponds to the regular guard interval mode preamble or the extension guard interval mode preamble based on modulation of the HEW-SIGA field 1152 (e.g., Q-BPSK) or based on an indication included in the HEW-SIGA field 1152, in various embodiments. Further, similar to the preamble 1151 of FIG. 11B, the preamble 1401 of FIG. 14A includes or omits the second L-LTF2 field 1156, depending on the embodiment and/or scenario.

Figure 15:
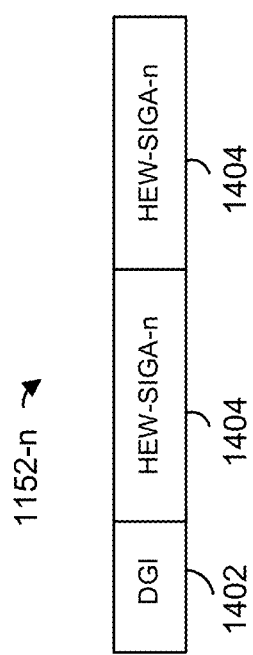
FIG. 15 is a block diagram illustrating format of a non-legacy signal field, according to an embodiment.

FIG. 15 is a block diagram illustrating format of an HEW-SIGA field 1500, according to an embodiment. In some embodiments, the HEW-SIGA field(s) 1152 of the data unit 1150 or the data unit 1400 are formatted as the HEW-SIGA field 1500. In some embodiments, the HEW-SIGA field(s) 1108 are formatted as the HEW-SIGA field 1500. The HEW-SIGA field 1500 includes a double guard interval 1502, a first repetition of a HEW-SIGA field 1504 and a second repetition of HEW-SIGA 1506. In an example embodiment, the DGI is 1.8 μs and each repetition of HEW-SIGA is 3.2 μs. In an embodiment, the repeated bits in the HEW-SIGA field 1500 are used to increase reliability of decoding of the HEW-SIGA field 1500. In an embodiment, the format of the HEW-SIGA field 1500 is used to auto-detect an extension guard interval mode preamble based on a comparison between autocorrelation of the HEW-SIGA field of the preamble using the format of the HEW-SIGA field 1500 and auto-correlation of the HEW-SIGA field of the preamble using the regular HEW-SIGA field format used in the regular guard interval mode, such as the format illustrated in FIG. 13A.

Figure 16:
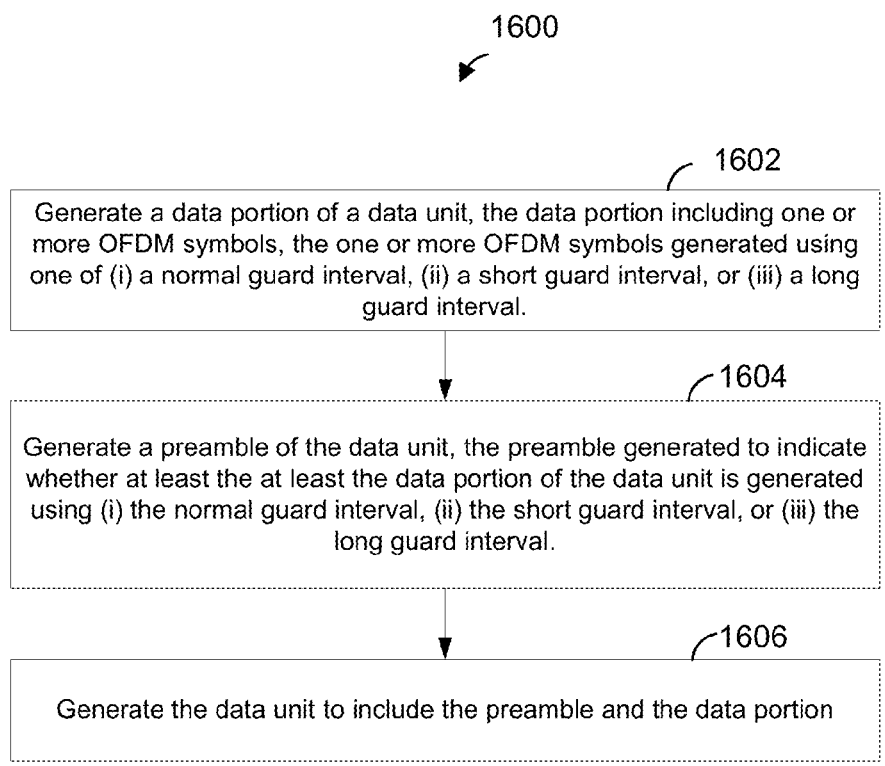
FIG. 16 is a flow diagram of a method for generating a data unit, according to an embodiment.

FIG. 16 is a flow diagram of an example method 1600 for generating a data unit, according to an embodiment. With reference to FIG. 1, the method 1600 is implemented by the network interface 16, in an embodiment. For example, in one such embodiment, the PHY processing unit 20 is configured to implement the method 1600. According to another embodiment, the MAC processing 18 is also configured to implement at least a part of the method 1600. With continued reference to FIG. 1, in yet another embodiment, the method 1600 is implemented by the network interface 27 (e.g., the PHY processing unit 29 and/or the MAC processing unit 28). In other embodiments, the method 1600 is implemented by other suitable network interfaces.

At block 1602, a data portion of the data unit is generated. Generating the data portion at block 1602 includes generating OFDM symbols of the data portion using one of (i) a normal guard interval, (ii) a short guard interval, or (iii) a long guard interval.

At block 1604, a preamble of the data unit is generated. The preamble generate at block 1604 is generated to indicate whether at least the data portion of the data unit generated able block 1602 is generated using (i) the normal guard interval, (ii) the short guard interval, or (iii) the long guard interval. In various embodiments and/or scenarios, one of the preambles 701 (FIGS. 9A, 10A), 751 (FIGS. 9B, 10B), 1101 (FIG. 11A), 1151 (FIG. 11B), or 1401 (FIG. 14A) is generated at block 1604. In other embodiments, other suitable preambles are generated at block 1604. In an embodiment, the preamble generated at block 1604 includes an GI indication to set to indicate whether at least the data portion is generated using (i) the normal guard interval, (ii) the short guard interval, or (iii) the long guard interval. In an embodiment, the GI indication comprises two bits. In an embodiment, a portion of the preamble, in addition to the data portion, is generated using the guard interval indicated by the GI indication. In another embodiment, the preamble generated at block 1604 is formatted such that a receiving device can automatically detect (e.g., without decoding) whether the preamble corresponds to a regular guard interval preamble or to an extension guard interval mode preamble. In an embodiment, detection of the extension guard interval preamble signals to the receiving device that at least the data portion is generated using the long guard interval.

At block 1606, the data unit is generated to include the preamble generated at block 1604 and the data portion generated at block 1602.

Figure 17:
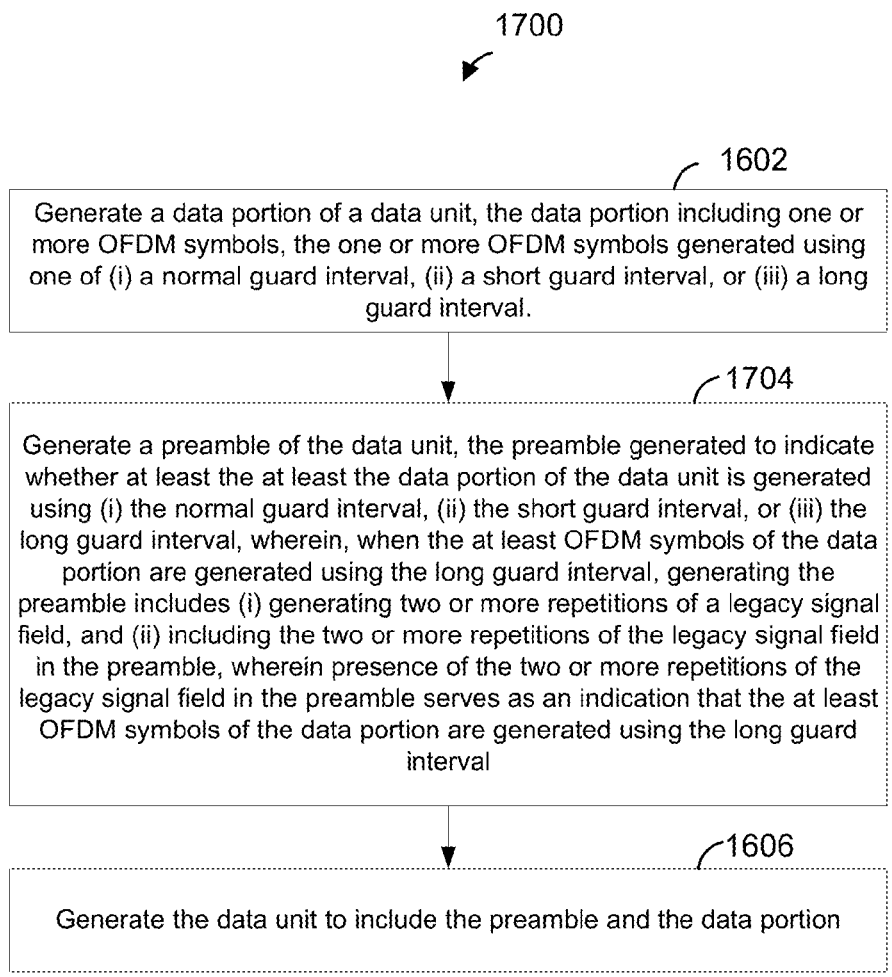
FIG. 17 is a flow diagram of a method for generating a data unit, according to another embodiment.

FIG. 17 is a flow diagram of an example method 1700 for generating a data unit, according to an embodiment. With reference to FIG. 1, the method 1700 is implemented by the network interface 16, in an embodiment. For example, in one such embodiment, the PHY processing unit 20 is configured to implement the method 1700. According to another embodiment, the MAC processing 18 is also configured to implement at least a part of the method 1700. With continued reference to FIG. 1, in yet another embodiment, the method 1700 is implemented by the network interface 27 (e.g., the PHY processing unit 29 and/or the MAC processing unit 28). In other embodiments, the method 1700 is implemented by other suitable network interfaces.

FIG. 17 is generally similar to FIG. 16, and includes like-numbered elements with FIG. 16, except that block 1604 in FIG. 16 is replaced by block 1704 in FIG. 17. Block 1704 is similar to block 1604 except that block 1704 includes, when the at least OFDM symbols of the data portion are generated using the long guard interval, (i) generating two or more repetitions of a legacy signal field, and (ii) including the two or more repetitions of the legacy signal field in the preamble, in an embodiment. Presence of the two or more repetitions of the legacy signal field in the preamble serves as an indication that the at least OFDM symbols of the data portion are generated using the long guard interval, in an embodiment.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

Further aspects of the present disclosure relate to one or more of the following clauses.

In an embodiment, a method for generating a data unit for transmission via a communication channel includes generating a data portion of the data unit, including generating orthogonal frequency division multiplexing (OFDM) symbols of the data portion using one of (i) a normal guard interval, (ii) a short guard interval and (iii) a long guard interval. The method also includes generating a preamble of the data unit, including generating the preamble to indicate whether at least OFDM symbols of the data portion are generated using the normal guard interval, the short guard interval, or the long guard interval. The method additionally includes generating the data unit to include the preamble and the data portion.

In other embodiments, the method includes any suitable combination of one or more of the following features.

Generating the preamble of the data unit includes generating a signal field of the preamble, wherein the signal field includes a guard interval indication set to indicate whether at least the OFDM symbols of the data portion are generated using the normal guard interval, the short guard interval, or the long guard interval.

The guard interval indication comprises two bits.

Generating the preamble includes generating a first portion of the preamble, wherein the first portion of the preamble is (i) generated using the normal guard interval and (ii) includes the signal field, and generating a second portion of the preamble using the guard interval indicated by the guard interval indication in the signal field.

Generating the preamble of the data unit comprises generating one of (i) a regular guard interval mode preamble or (ii) an extension guard interval mode preamble.

Generating the preamble includes formatting the preamble such that a receiving device can automatically detect whether the preamble corresponds to the regular guard interval preamble or to the extension guard interval preamble, wherein the extension guard interval mode preamble serves as the indication that at least the OFDM symbols of the data portion are generated using the long guard interval when the preamble corresponds to the extension guard interval preamble.

Generating the extension guard interval preamble includes including, in the extension guard interval preamble, two or more repetitions of a legacy signal field, and wherein the receiving device can automatically detect that the preamble corresponds the extension guard interval mode preamble based on detecting the two or more repetitions of the legacy signal field.

Generating the extension guard interval mode preamble includes generating a non-legacy signal field to be included in the preamble, and modulating the non-legacy signal field differently from a corresponding non-legacy signal field in the regular guard interval mode preamble.

The receiving device can automatically detect that the preamble corresponds to the extension guard interval mode preamble by detecting the modulation of the non-legacy signal field.

Generating the non-legacy signal field includes generating the non-legacy signal field using the long guard interval.

Generating the extension guard interval mode preamble includes generating, using the long guard interval, a non-legacy signal field to be included in the preamble, and wherein the receiving device can automatically detect that the preamble corresponds to the extension mode guard interval preamble by comparing results of autocorrelation of the non-legacy signal field performed using the long guard interval and autocorrelation of the non-legacy signal field performed using the normal guard interval.

The data unit conforms to a first communication protocol, and wherein generating the preamble further comprises generating the preamble such that (i) a legacy receiver configured to operate according to a legacy communication protocol but not according to the first communication protocol can determine a duration of the data unit and (ii) a receiver configured to operate according to the first communication protocol can detect that the data unit conforms to the first communication protocol.

In another embodiment, an apparatus comprises a network interface configured to generate a data portion of the data unit, including generating orthogonal frequency division multiplexing (OFDM) symbols of the data portion using one of (i) a normal guard interval, (ii) a short guard interval and (iii) a long guard interval. The network interface is also configured to generate a preamble of the data unit, including generating the preamble to indicate whether at least OFDM symbols of the data portion are generated using the normal guard interval, the short guard interval, or the long guard interval. The network interface is additionally configured to generate the data unit to include the preamble and the data portion.

In other embodiments, the apparatus includes any suitable combination of one or more of the following features.

The network interface is further configured to generate a signal field to be included in the preamble, wherein the signal field includes a guard interval indication set to indicate whether at least the OFDM symbols of the data portion are generated using the normal guard interval, the short guard interval, or the long guard interval.

The guard interval indication comprises two bits.

The network interface is further configured to generate a first portion of the preamble, wherein the first portion of the preamble is (i) generated using the normal guard interval and (ii) includes the signal field, and generate a second portion of the preamble using the guard interval indicated by the guard interval indication in the signal field.

Generating the preamble of the data unit comprises generating one of (i) a regular guard interval mode preamble or (ii) an extension guard interval mode preamble, wherein generating the preamble includes formatting the preamble such that a receiving device can automatically detect whether the preamble corresponds to the regular guard interval preamble or to the extension guard interval preamble, wherein the extension guard interval mode preamble serves as the indication that at least the OFDM symbols of the data portion are generated using the long guard interval when the preamble corresponds to the extension guard interval preamble.

Generating the extension guard interval preamble includes including, in the extension guard interval preamble, two or more repetitions of a legacy signal field, and wherein the receiving device can automatically detect that the preamble corresponds the extension guard interval mode preamble based on detecting the two or more repetitions of the legacy signal field.

Generating the extension guard interval mode preamble includes generating a non-legacy signal field to be included in the preamble, and modulating the non-legacy signal field differently from a corresponding non-legacy signal field in the regular guard interval mode preamble.

The receiving device can automatically detect that the preamble corresponds to the extension guard interval mode preamble by detecting the modulation of the non-legacy signal field.

Generating the non-legacy signal field includes generating the non-legacy signal field using the long guard interval.

Generating the extension guard interval mode preamble includes generating, using the long guard interval, a non-legacy signal field to be included in the preamble, and wherein the receiving device can automatically detect that the preamble corresponds to the extension mode guard interval preamble by comparing results of autocorrelation of the non-legacy signal field performed using the long guard interval and autocorrelation of the non-legacy signal field performed using the normal guard interval.

The data unit conforms to a first communication protocol, and wherein generating the preamble further comprises generating the preamble such that (i) a legacy receiver configured to operate according to a legacy communication protocol but not according to the first communication protocol can determine a duration of the data unit and (ii) a receiver configured to operate according to the first communication protocol can detect that the data unit conforms to the first communication protocol.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for generating a data unit for transmission via a wireless communication channel, the method comprising:
    selecting, at a wireless network interface device, a guard interval from a set of guard intervals including a first guard interval, a second guard interval, and a third guard interval, wherein the first guard interval has a length that is 50% of a length of the second guard interval, and wherein the length of the second guard interval is 50% of a length of the third guard interval;
    generating, at the wireless network device, the data unit, wherein the data unit is generated to conform to a first communication protocol, wherein the data unit includes a preamble and a data portion;
    generating, at the wireless network interface device, the preamble of the data unit to include:
        a legacy signal field,
        a repetition of the legacy signal field, and
        a non-legacy field that includes a field that indicates the selected guard interval, wherein generating the preamble comprises generating the preamble such that (i) a legacy receiver configured to operate according to a legacy communication protocol but not according to the first communication protocol can determine a duration of the data unit by decoding the legacy signal field, and (ii) a receiver configured to operate according to the first communication protocol can detect that the data unit conforms to the first communication protocol; and
    generating, at the wireless network interface device, the data portion of the data unit, including generating orthogonal frequency division multiplexing (OFDM) symbols of the data portion using the selected guard interval.

2. The method of claim 1, wherein the field that indicates the selected guard interval comprises two bits.

3. The method of claim 1, wherein generating the preamble includes:
    generating a first portion of the preamble, wherein the first portion of the preamble is (i) generated using one of the first guard interval, the second guard interval, and the third guard interval that is different than the selected guard interval, and (ii) includes the legacy signal field, and
    generating a second portion of the preamble using the selected guard interval.

4. The method of claim 3, wherein the second portion of the preamble includes the non-legacy signal field.

5. The method of claim 1, further comprising:
    transmitting, by the wireless network interface device, the data unit via one or more antennas.

6. An apparatus comprising:
    a wireless network interface device having one or more integrated circuits configured to
        select a guard interval from a set of guard intervals including a first guard interval, a second guard interval, and a third guard interval, wherein the first guard interval has a length that is 50% of a length of the second guard interval, and wherein the length of the second guard interval is 50% of a length of the third guard interval, and generate a data unit that conforms to a first communication protocol, wherein the data unit includes a preamble and a data portion;

wherein the one or more integrated circuits are configured to generate the preamble of the data unit to include:
a legacy signal field,
a repetition of the legacy signal field, and
a non-legacy field that includes a field that indicates the selected guard interval, wherein the preamble is generated such that (i) a legacy receiver configured to operate according to a legacy communication protocol but not according to the first communication protocol can determine a duration of the data unit by decoding the legacy signal field, and (ii) a receiver configured to operate according to the first communication protocol can detect that the data unit conforms to the first communication protocol; and wherein the one or more integrated circuits are further configured to generate the data portion of the data unit, including generating orthogonal frequency division multiplexing (OFDM) symbols of the data portion using the selected guard interval.

7. The apparatus of claim 6, wherein the field that indicates the selected guard interval comprises two bits.

8. The apparatus of claim 6, wherein the one or more integrated circuits are further configured to:
generate a first portion of the preamble, wherein the first portion of the preamble is (i) generated using one of the first guard interval, the second guard interval, and the third guard interval that is different than the selected guard interval, and (ii) includes the legacy signal field; and
generate a second portion of the preamble using the selected guard interval.

9. The apparatus of claim 8, wherein the second portion of the preamble includes the non-legacy signal field.

10. The apparatus of claim 7, wherein the wireless network interface device comprises:
a physical layer (PHY) processing unit implemented on the one or more integrated circuits;
wherein the PHY processing unit is configured to:
generate the preamble of the data unit, and
generate the data portion of the data unit.

11. The apparatus of claim 10, wherein the PHY processing unit comprises:
one or more transceivers implemented on the one or more integrated circuits.

12. The apparatus of claim 11, further comprising:
one or more antennas coupled to the one or more transceivers.

13. A tangible, non-transitory computer readable medium, or media, storing machine readable instructions that, when executed by one or more processors, cause the one or more processors to:
select a guard interval from a set of guard intervals including a first guard interval, a second guard interval, and a third guard interval, wherein the first guard interval has a length that is 50% of a length of the second guard interval, and wherein the length of the second guard interval is 50% of a length of the third guard interval;
cause a wireless network interface device to generate a data unit that conforms to a first communication protocol, wherein the data unit includes a preamble and a data portion;
cause the wireless network interface device to generate the preamble of the data unit to include:
a legacy signal field,
a repetition of the legacy signal field, and
a non-legacy signal field that includes a field that indicates the selected guard interval, wherein the preamble is generated such that (i) a legacy receiver configured to operate according to a legacy communication protocol but not according to the first communication protocol can determine a duration of the data unit by decoding the legacy signal field, and (ii) a receiver configured to operate according to the first communication protocol can detect that the data unit conforms to the first communication protocol;
cause the wireless network interface device to generate the data portion of the data unit, including generating orthogonal frequency division multiplexing (OFDM) symbols of the data portion using the selected guard interval; and
cause the wireless network interface device to transmit the data unit via a wireless communication channel.

14. The tangible, non-transitory computer readable medium, or media, of claim 13, wherein the field that indicates the selected guard interval comprises two bits.

15. The tangible, non-transitory computer readable medium, or media, of claim 13, further storing machine readable instructions that, when executed by the one or more processors, cause the one or more processors to:
generate a first portion of the preamble, wherein the first portion of the preamble is (i) generated using one of the first guard interval, the second guard interval, and the third guard interval that is different than the selected guard interval, and (ii) includes the legacy signal field; and
generate a second portion of the preamble using the selected guard interval.

16. The tangible, non-transitory computer readable medium, or media, of claim 15, wherein the second portion of the preamble includes the non-legacy signal field.

* * * * *